Oct. 31, 1939.  R. K. LEE  2,177,896
MOTOR VEHICLE
Filed Nov. 7, 1936   11 Sheets-Sheet 1

INVENTOR
ROGER K. LEE.
BY
ATTORNEYS

Oct. 31, 1939.   R. K. LEE   2,177,896
MOTOR VEHICLE
Filed Nov. 7, 1936   11 Sheets-Sheet 2

INVENTOR
ROGER K. LEE.
BY
ATTORNEYS

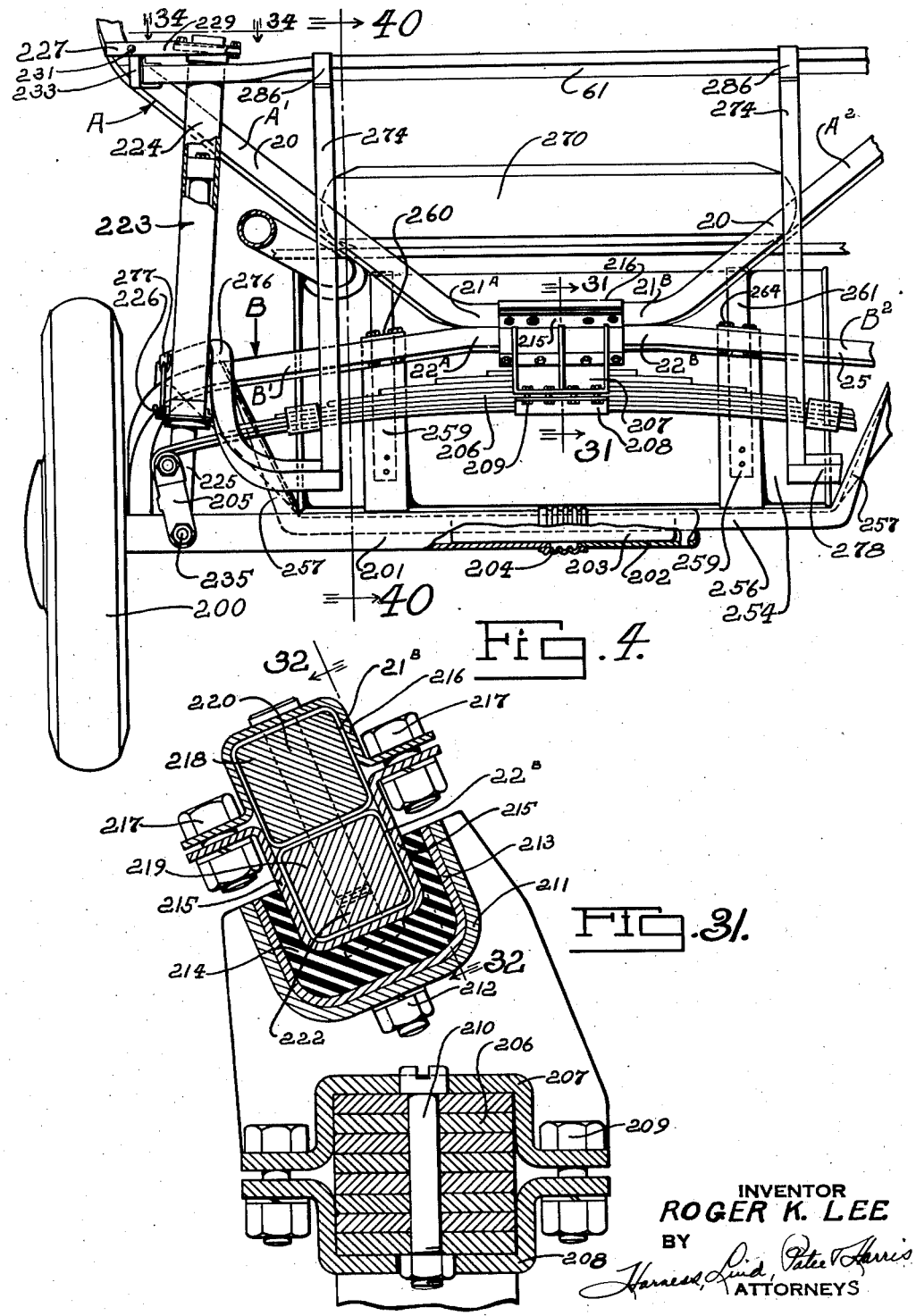

Oct. 31, 1939.  R. K. LEE  2,177,896
MOTOR VEHICLE
Filed Nov. 7, 1936  11 Sheets-Sheet 4
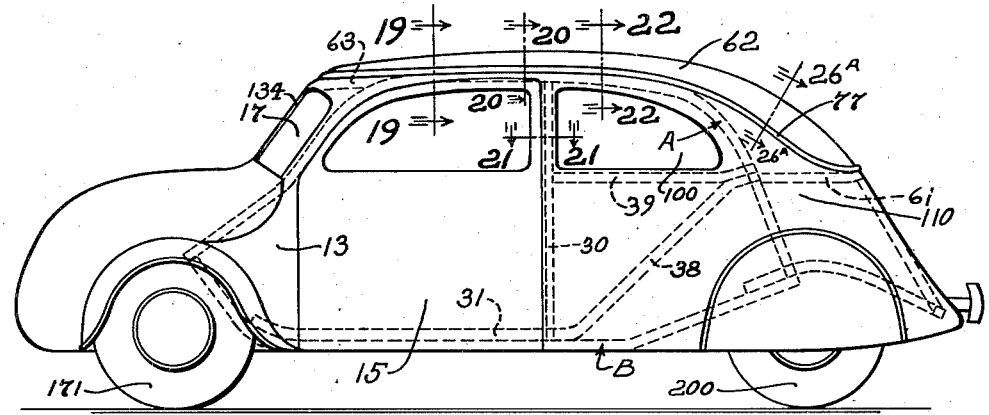
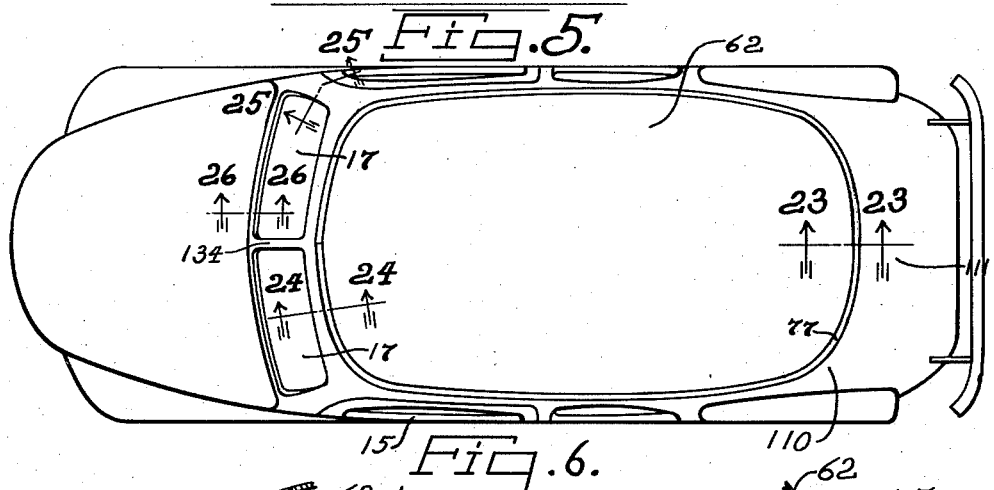
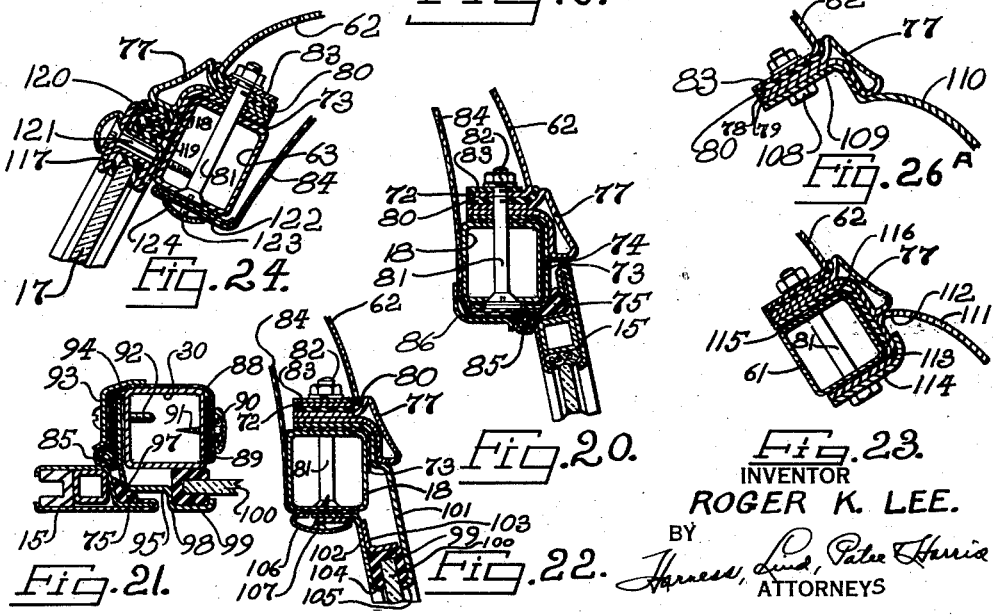
INVENTOR
ROGER K. LEE.
BY
ATTORNEYS Oct. 31, 1939.  R. K. LEE  2,177,896
MOTOR VEHICLE
Filed Nov. 7, 1936  11 Sheets-Sheet 5

INVENTOR
ROGER K. LEE.
BY
ATTORNEYS

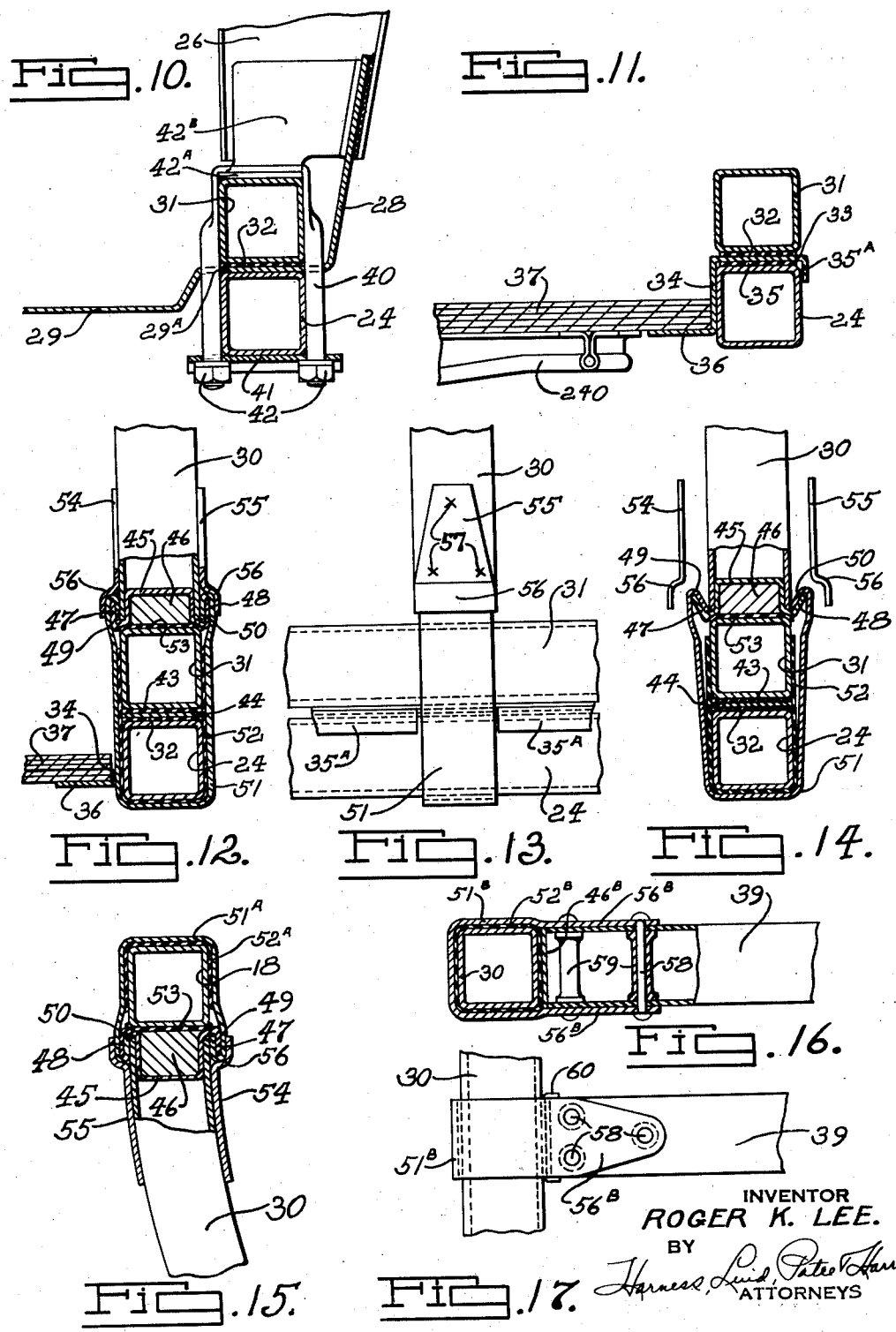

INVENTOR
ROGER K. LEE.
BY
ATTORNEYS

Oct. 31, 1939.   R. K. LEE   2,177,896
MOTOR VEHICLE
Filed Nov. 7, 1936   11 Sheets-Sheet 8
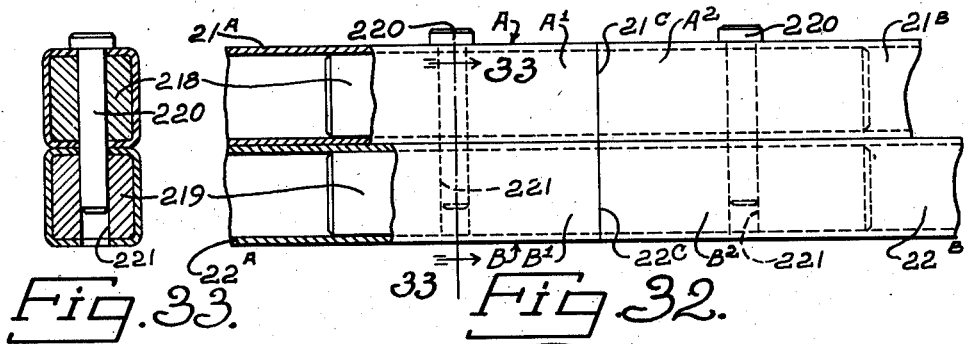
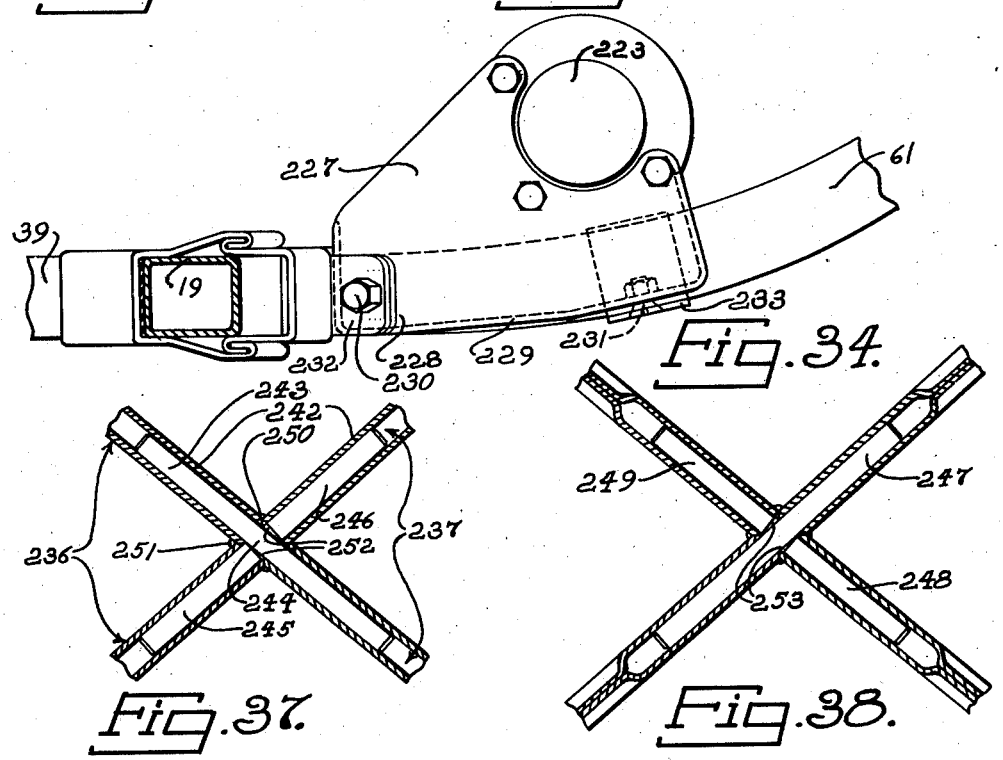
INVENTOR
ROGER K. LEE.
BY
ATTORNEYS Oct. 31, 1939.    R. K. LEE    2,177,896
MOTOR VEHICLE
Filed Nov. 7, 1936    11 Sheets-Sheet 9
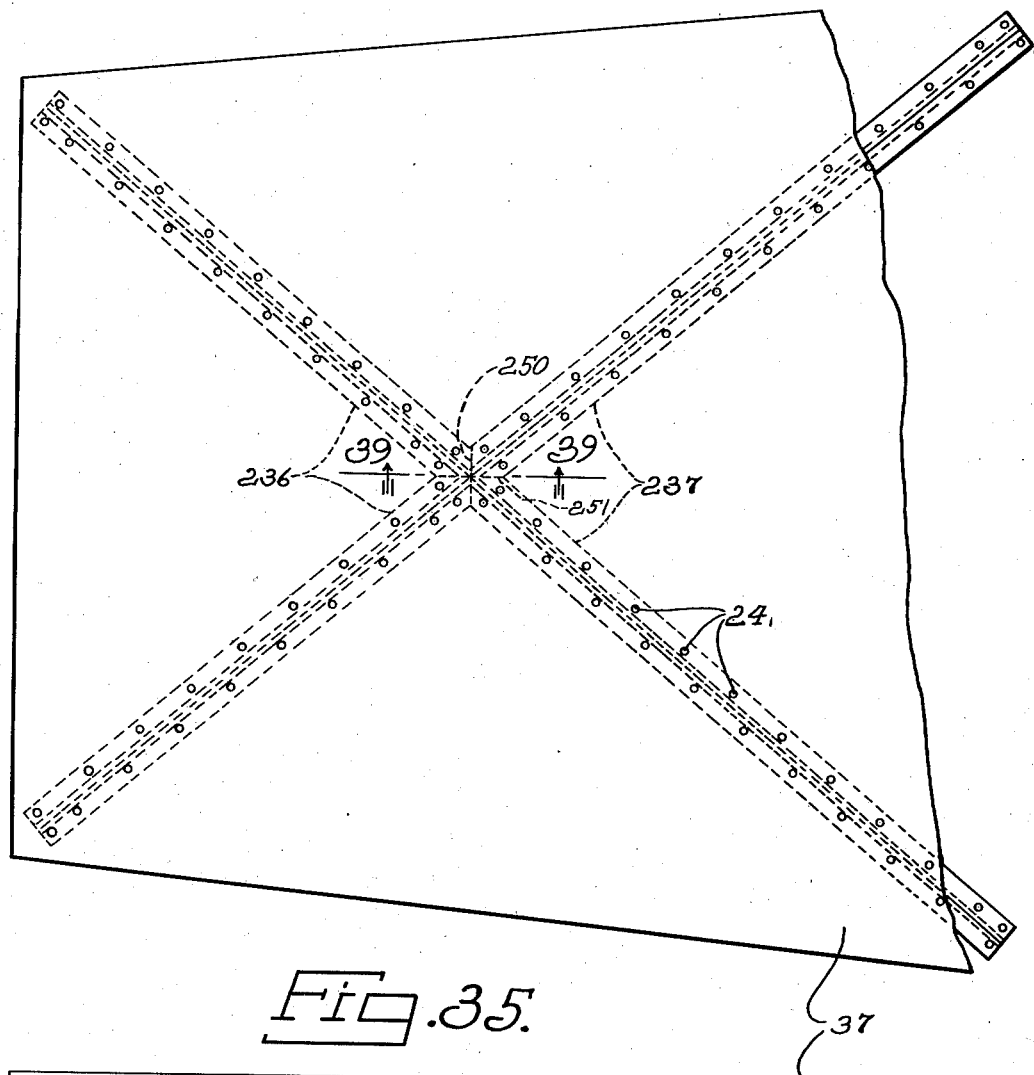
Fig. 35.
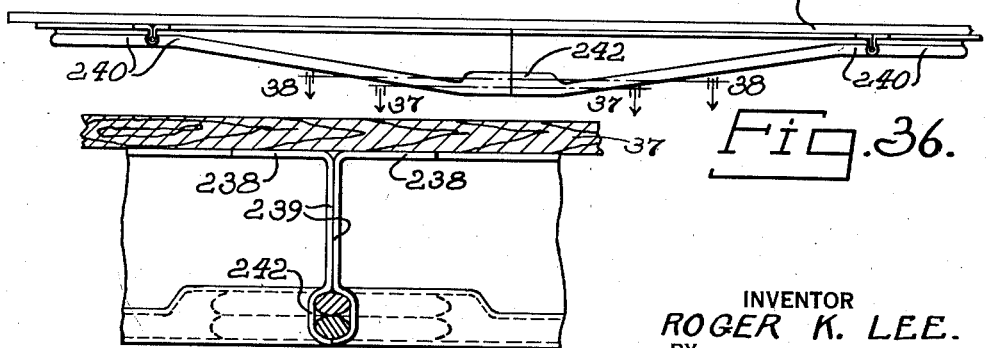
Fig. 36.
Fig. 39.
INVENTOR
ROGER K. LEE.
BY
ATTORNEYS Oct. 31, 1939.                R. K. LEE                 2,177,896
                            MOTOR VEHICLE
                         Filed Nov. 7, 1936           11 Sheets-Sheet 10

INVENTOR
ROGER K. LEE.
BY
ATTORNEYS

Patented Oct. 31, 1939

2,177,896

UNITED STATES PATENT OFFICE 2,177,896

MOTOR VEHICLE

Roger K. Lee, Highland Park, Mich., assignor to Chrysler Corporation, Highland Park, Mich., a corporation of Delaware Application November 7, 1936, Serial No. 109,695

55 Claims. (Cl. 296—28)

This invention relates to motor vehicles and refers more particularly to improvements in automobile and truck body frame structures and associated vehicle parts.

One object of my invention is to provide an improved vehicle having improved characteristics of strength, lightness of weight, and low cost manufacture.

Another object of my invention is to provide a metal body frame structure of such construction that the frame presents a very rigid structure against undesired weaving and deflections and wherein the frame is so fabricated that it is unusually light in weight.

My frame structure is preferably fabricated by parts which are tubular and, while I do not limit my invention to particular cross-sectional shapes, I preferably employ metal tubes square in cross-section. In its preferred embodiment, my invention comprises upper and lower main loop frame members shaped in generally oblong formation when viewed in plan, these loops being secured together at their ends and forming trusses yieldingly loaded at their ends on the ground wheels. The frame members are braced and reinforced in a novel manner to present an efficient distribution of metal, the main frame structure preferably being approximately equal to the vehicle wheel base length.

An important further feature of my invention resides in the provision of a novel means for clamping the frame elements together in abutting and in other relationships whereby the parts are insulated against metal to metal engagement and still present a highly rigid fabricated body.

Further objects of my invention are to provide improved fabrication of the body and roof panels in conjunction with the body frame structure with the view of simplifying and strengthening the structure as a whole.

Another feature of my invention is to provide a novel floor structure and reinforcing permitting the use of a light wood floor. The reinforcing preferably is in the form of an X-bracing of improved fabrication for adding rigidity to the floor panel.

Further objects and advantages of my invention reside in the novel combinations and arrangement of parts more particularly hereinafter described in detail, reference being had to the accompanying drawings illustrating one form of the principles of my invention and in which:

Fig. 4 is a rear elevational view of the frame illustrating the rear ground wheel mounting and the gasoline tank assembly.

Fig. 5 is a side elevational view of the vehicle illustrating certain of the body frame parts in dotted lines.

Fig. 6 is a top plan view of the vehicle shown in Fig. 5.

Fig. 10 is a detail sectional view through the front door forward column taken as indicated by line 10—10 of Fig. 1.

Fig. 11 is a sectional view through the reinforced body side sill taken as indicated by line 11—11 of Fig. 1.

Fig. 12 is a view similar to Fig. 11 but taken through line 12—12 of Fig. 1 at the front door rear column.

Fig. 13 is a side elevational view of the Fig. 12 structure.

Fig. 14 is a view illustrating the method of assembly for the column and body sill joint shown in Fig. 12.

Fig. 15 is a detail sectional view illustrating the joint at line 15—15 of Fig. 1.

Fig. 16 is a detail sectional view along line 16—16 of Fig. 1.

Fig. 17 is a side elevational view of the Fig. 16 structure.

Fig. 20 is a sectional elevational view through the roof structure as indicated by line 20—20 in Fig. 5.

Fig. 21 is a sectional plan view through the front door and rear column at line 21—21 in Fig. 5.

Fig. 22 is a sectional elevational view of the roof and window structure at line 22—22 of Fig. 5.

Fig. 23 is a detail sectional elevational view along line 23—23 of Fig. 6 illustrating the rear panel and roof panel connection.

Fig. 24 is a sectional elevation view through the windshield header taken along line 24—24 of Fig. 6.

Figure 26:
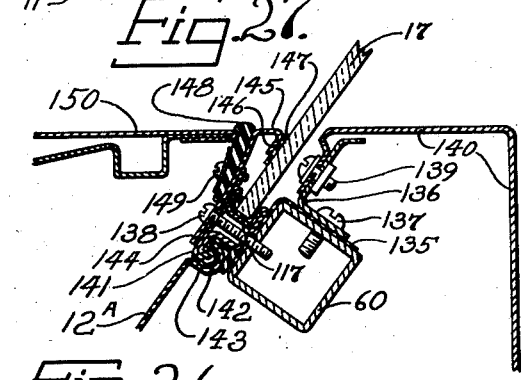

Fig. 26ᵃ is a detail sectional view of the roof panel taken at line 26ᵃ—26ᵃ of Fig. 5.

Fig. 26 is a sectional elevational view along line 26—26 of Fig. 6 illustrating the structure at the lower end of the windshield frame.

Figures 27, 28:
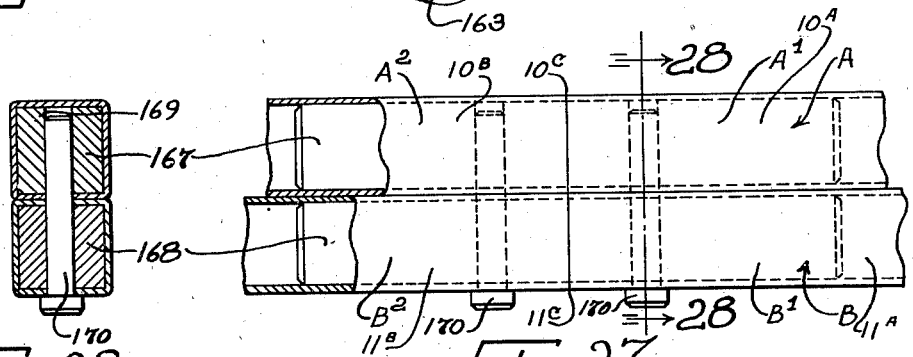
Figure 7:
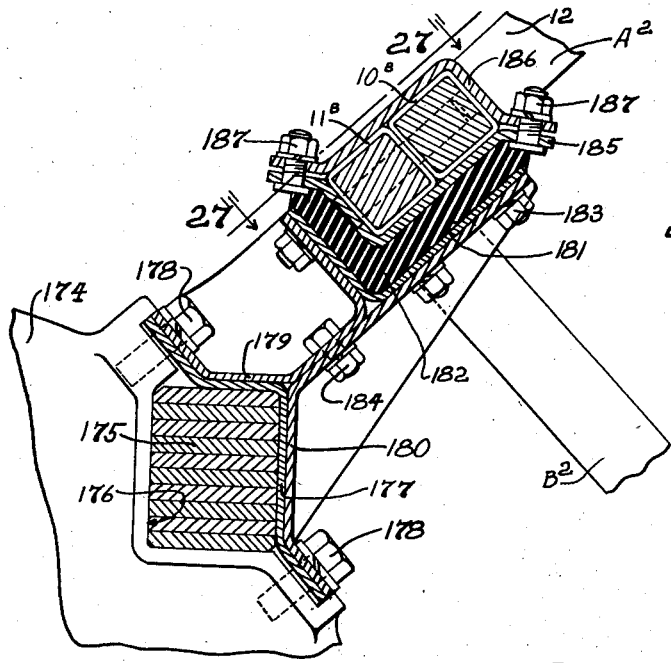
Fig. 7 is a detail sectional view of the front spring and body frame connection, the view being taken as illustrated by the line 7—7 of Fig. 29.
Figure 8:
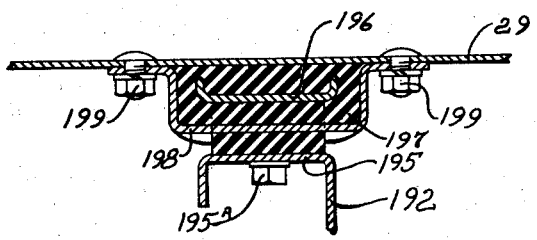
Fig. 8 is a detail sectional view through line 8—8 of Fig. 29.

Fig. 27 is an elevational view of the front connections for the body frame members taken generally as indicated by line 27—27 of Fig. 7 but with the frame clamping assembly removed, portions of the hollow frame members being broken away to illustrate the inserts.

Fig. 28 is a sectional view along line 28—28 of Fig. 27.

Figure 29:
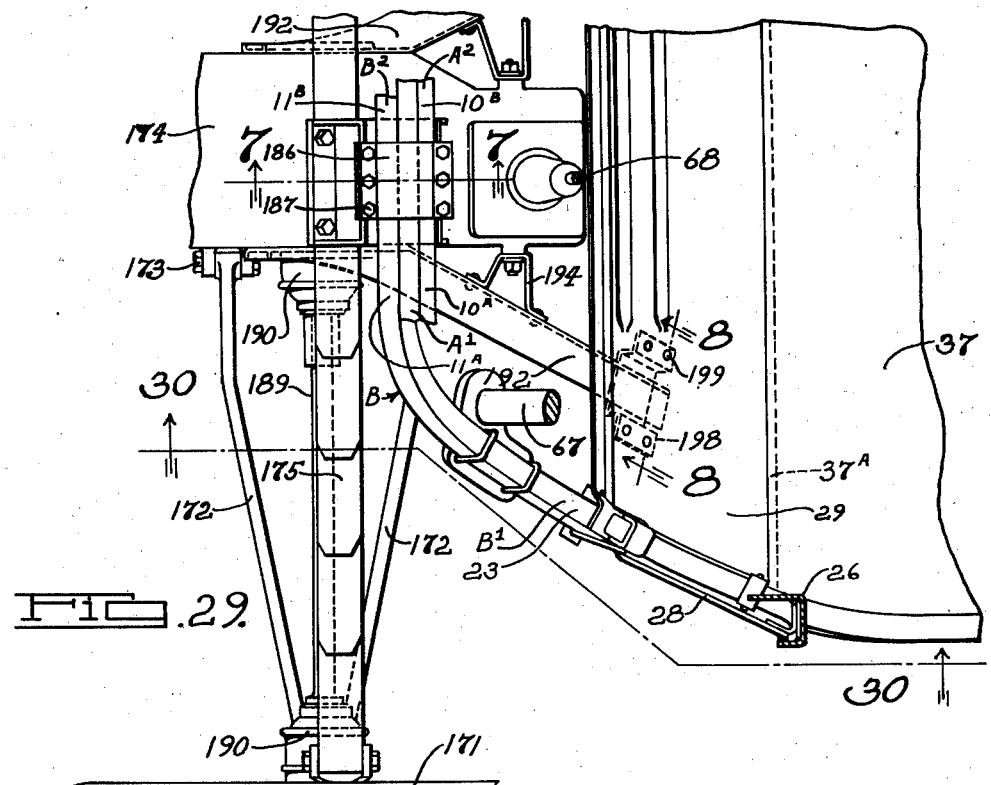

Fig. 29 is a plan view of a portion of the front end of the body and associated ground wheel, portions of the frame being broken away.

Figure 30:
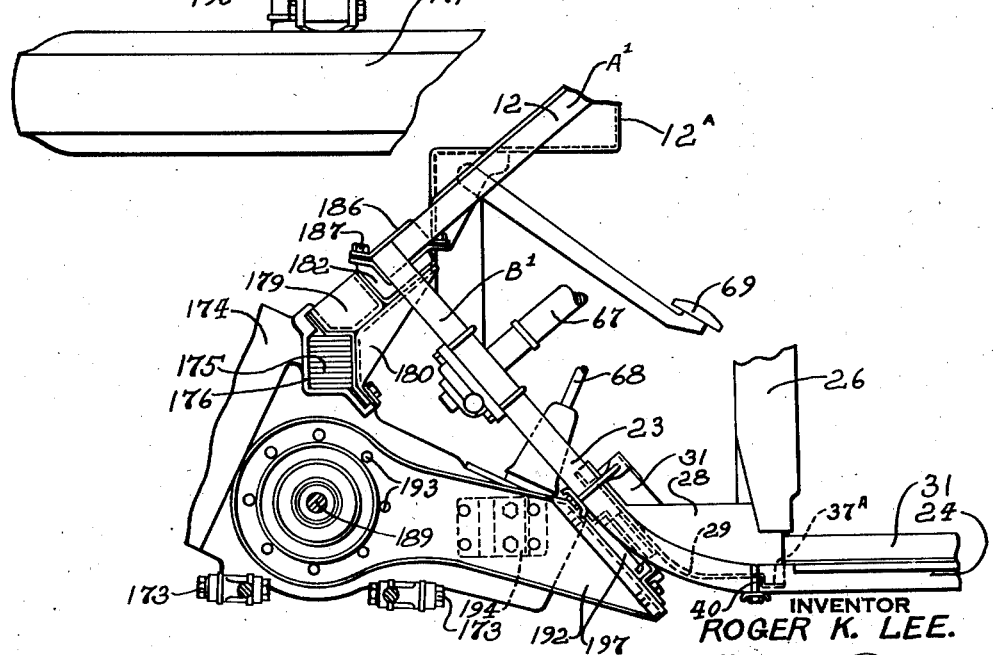

Fig. 30 is a side view partly in section taken generally as indicated by line 30—30 of Fig. 29.

Fig. 31 is a sectional elevational view of the rear frame end and associated spring taken along line 31—31 of Fig. 4.

Fig. 32 is an elevational view of the rear connections for the body frame members taken generally as indicated by line 32—32 of Fig. 31 but with the frame clamping assembly removed, portions of the hollow frame members being broken away to illustrate the inserts.

Fig. 33 is a sectional view taken along 33—33 of Fig. 32.

Fig. 34 is a detail plan view illustrating the upper connection for one of the rear wheel stabilizers, the view being taken as indicated by line 34—34 of Fig. 4.

Fig. 35 is a top plan view of the floor structure broken away to illustrate the reinforcement therefor.

Fig. 36 is a front elevational view of the Fig. 35 structure.

Fig. 37 is a sectional plan view taken as indicated by line 37—37 of Fig. 36.

Fig. 38 is a sectional plan view taken as indicated by line 38—38 of Fig. 36.

Fig. 39 is an enlarged sectional view taken along line 39—39 of Fig. 35.

Figure 40:
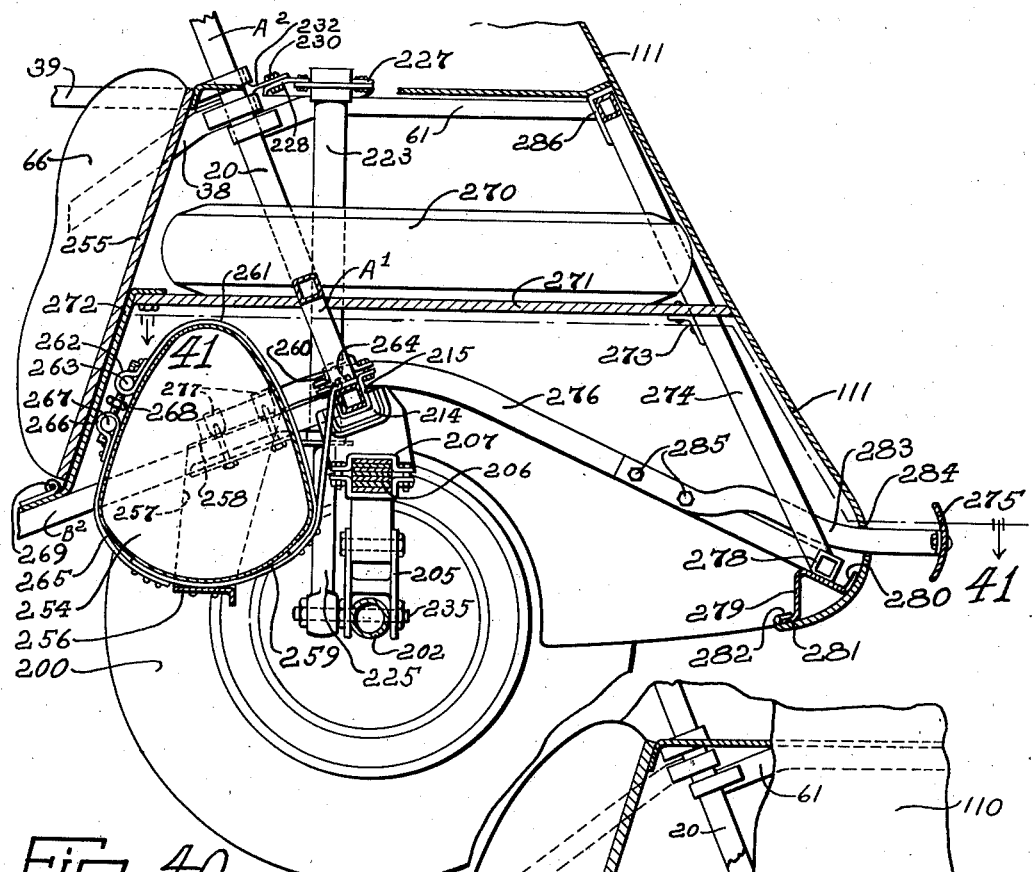

Fig. 40 is a sectional elevational view taken along line 40—40 of Fig. 4 illustrating the gasoline tank assembly and the body frame supplemental rear structure.

Figure 41:
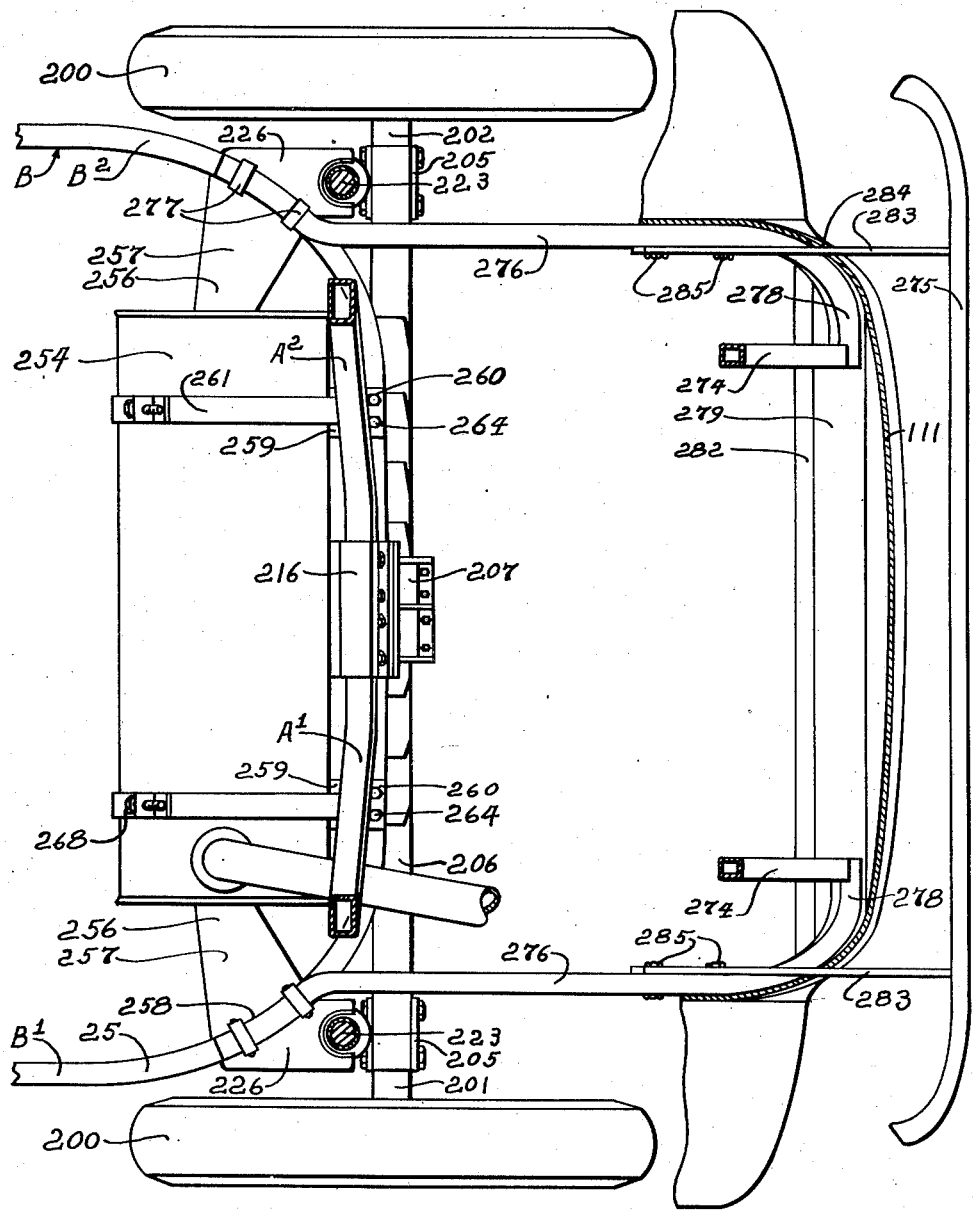

Fig. 41 is a sectional plan view of the supplemental rear structure taken approximately as indicated by line 41—41 of Fig. 40.

Figure 42:
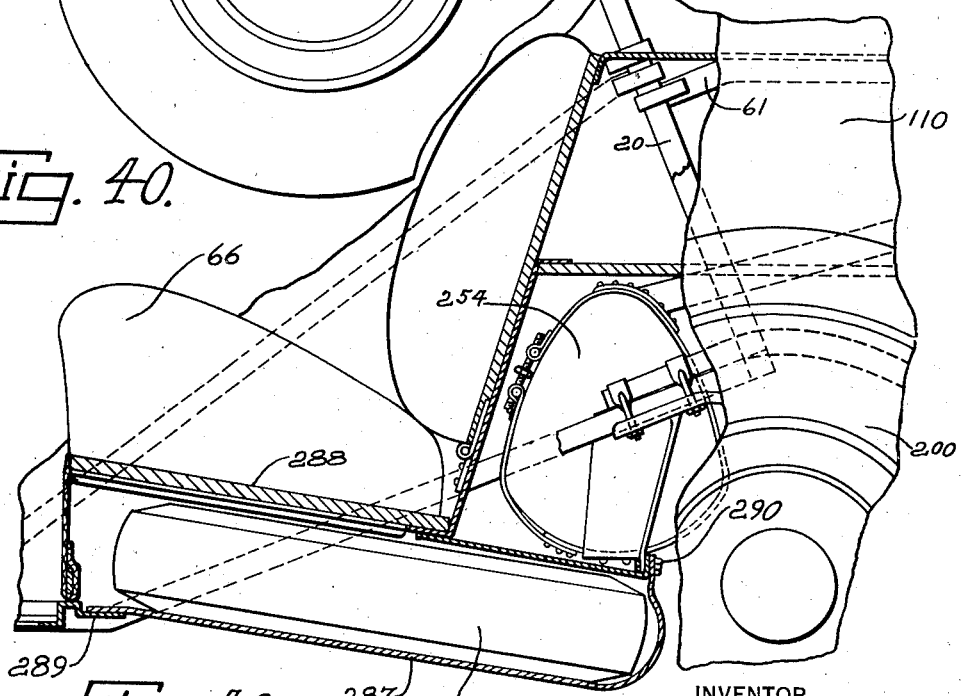

Fig. 42 is a view generally corresponding to Fig. 40 but illustrating a modified arrangement for storing the spare tire and wheel assembly.

Referring to the drawings, the frame structure of the motor vehicle comprises a pair of main or primary frame members A and B. These frame members A and B are preferably in the form of upper and lower substantially oblong loops when viewed in plan, each being formed of metallic tubing, preferably rectangular in cross section, to facilitate the fabrication of the frame structure and to provide maximum strength and lightness of weight. The rectangular tubing may be formed of seamless drawn tubing or may be rolled into shape from flat stock and then welded longitudinally. Members A and B are formed substantially the same length longitudinally of the vehicle and are secured together at their ends at points or zones lying in or closely adjacent to vertical transverse planes respectively containing the ground contacts of the front and rear wheels so that in the preferred embodiment of my invention these main frame members having a length approximately equal to the vehicle wheel base.

For convenience of manufacture, each main frame member A and B is preferably formed of a pair of endless main side members A', A² and B', B² respectively. Each pair of side members is rigidly connected together at their opposite ends to form the aforesaid loops and these loops are rigidly joined together at opposite ends of the frame structure, preferably centrally of the vehicle body frame structure, as will presently be apparent. If desired, each main frame member A and B may be formed of a single length of tubing having ends connected at a single point, but for commercial manufacture it is deemed desirable to fabricate each member A and B with the aforesaid side members, each loop being in effect structurally continuous.

The front connection of frame members A', A² and B', B² is best illustrated in Figs. 7, 27 and 28, and the rear connection of these members in Figs. 31, 32 and 33. At the front connection, the upper member A has its component parts A', A² terminating forwardly in the transversely extending front end portions 10ᵃ, 10ᵇ respectively. These end portions are brought together at 10ᶜ and are disposed adjacent the similarly disposed front end portions 11ᵃ, 11ᵇ of the component parts B', B² of the lower member B. The end portions 11ᵃ, 11ᵇ are brought together at 11ᶜ in the plane of the end portions at 10ᶜ, adjacent faces of the end portions 10ᵃ, 11ᵃ and 10ᵇ, 11ᵇ being parallel and brought together to provide a double hollow beam structure preferably inclined upwardly and rearwardly in the general direction of inclination of the rearward extensions 12 of portions 10ᵃ and 10ᵇ respectively.

Inasmuch as the two sides of the vehicle body structure are preferably similarly constructed, the description will, for the most part, be directed to one side of the vehicle.

The extensions 12 slope upwardly and rearwardly at opposite sides of the frame structure to form a portion of the framework for supporting the dash 12ᵃ and cowl 13, and thence each extension continues upwardly and rearwardly at 14 to provide the sloping upper portion of a forward door post or pillar for the door 15 at the driver's compartment 16. Each frame portion 14 also provides a side boundary support for a glass windshield 17.

Each door post portion 14 has its upper end curved to extend further rearwardly to provide a longitudinally extending roof rail portion 18, it being noted that these rail portions 18 are disposed intermediate the length of the unitary main upper frame members A' and A². Each roof rail portion continues rearwardly and downwardly to form the sloping rear upright portions 19 which converge through the downwardly and inwardly sloping portions 20 to the respective transversely extending rear end portions 21ᵃ and 21ᵇ to complete the structurally continuous oblong loop frame member A.

At the rear connection, the upper member A has its component parts A', A² thus terminating rearwardly in the transversely extending rear end portions 21ᵃ, 21ᵇ respectively. These end portions are brought together at 21ᶜ and are disposed adjacent the similarly disposed rear end portions 22ᵃ, 22ᵇ of the component parts B', B² of the lower member B. The end portions 22ᵃ, 22ᵇ are brought together at 22ᶜ in the plane of the end portions at 21ᶜ, adjacent faces of the end portions 21ᵃ, 21ᵇ and 22ᵃ, 22ᵇ being parallel and brought together to provide a double hollow beam structure preferably inclined upwardly and forwardly in the general direction of inclination of the upright sloping portions 19 and 20.

The upper frame member A thus forms a truss of efficient rigid character receiving most of the thrusts from the front and rear ground wheels adjacent the end portions 10ᶜ and 21ᶜ for normally placing the upper member A in compression, as will be presently more apparent.

The lower main frame member B is preferably in the form of an inverted truss, the front end portions 11ᵃ and 11ᵇ each extending downwardly and rearwardly at 23 along one side of the vehicle to provide the bottom bracing of cowl 13 and to support the toeboard structure across the front end of the driver's compartment 16. Each portion 23 then extends rearwardly to provide a bottom sill or body rail 24 which lies intermediate the length of a respective frame member B' or B² and extends approximately parallel with the slightly curving roof rail portion 18 at the same side of the vehicle.

The rearward end of each frame member B' and B² is deflected upwardly to form the converging side portions 25 which are connected by the aforesaid transversely extending rear end portions 22ᵃ and 22ᵇ to complete the structurally continuous oblong loop frame member B. With the wheel supporting thrusts applied for the most part at the ends of the frame members A and B, it will be apparent that the bottom frame member B is normally under tension.

Figure 1:
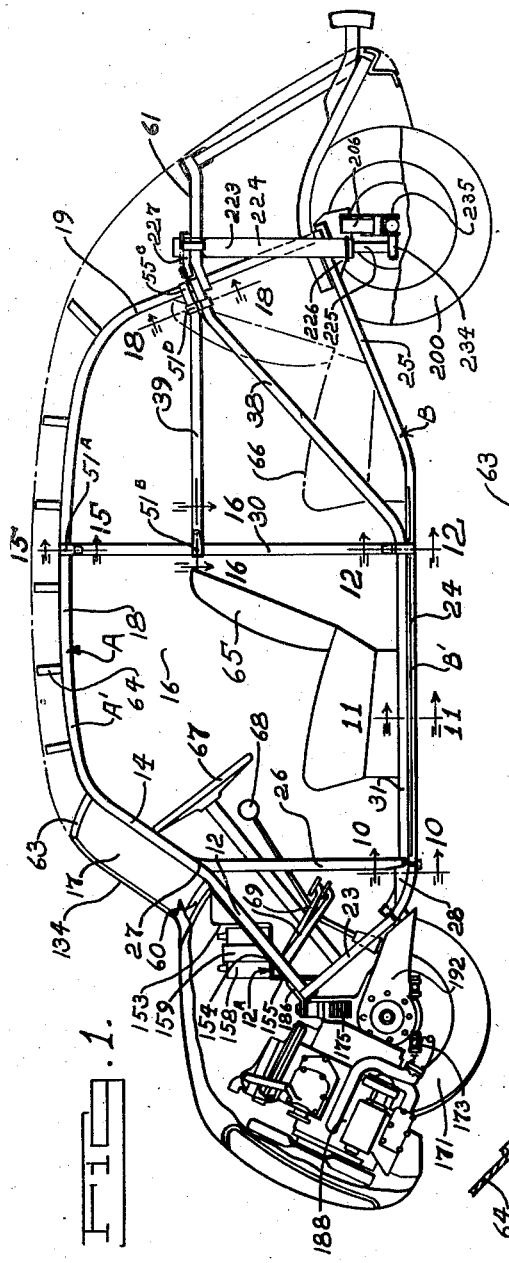
Fig. 1 is a side elevational view of my motor vehicle with the outer panels removed to illustrate my body frame structure.
Figure 2:
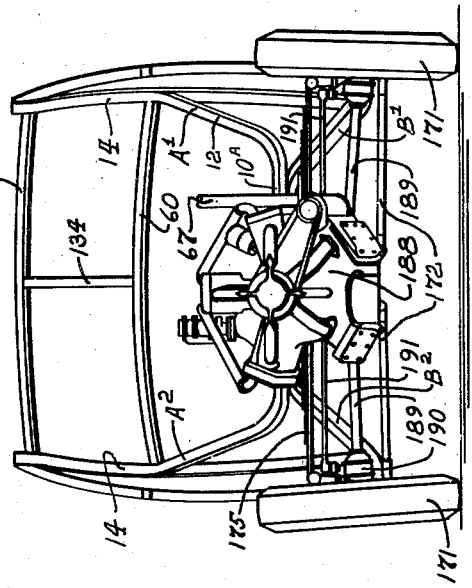
Fig. 2 is a front elevational view showing the vehicle power plant and body frame.
Figure 9:
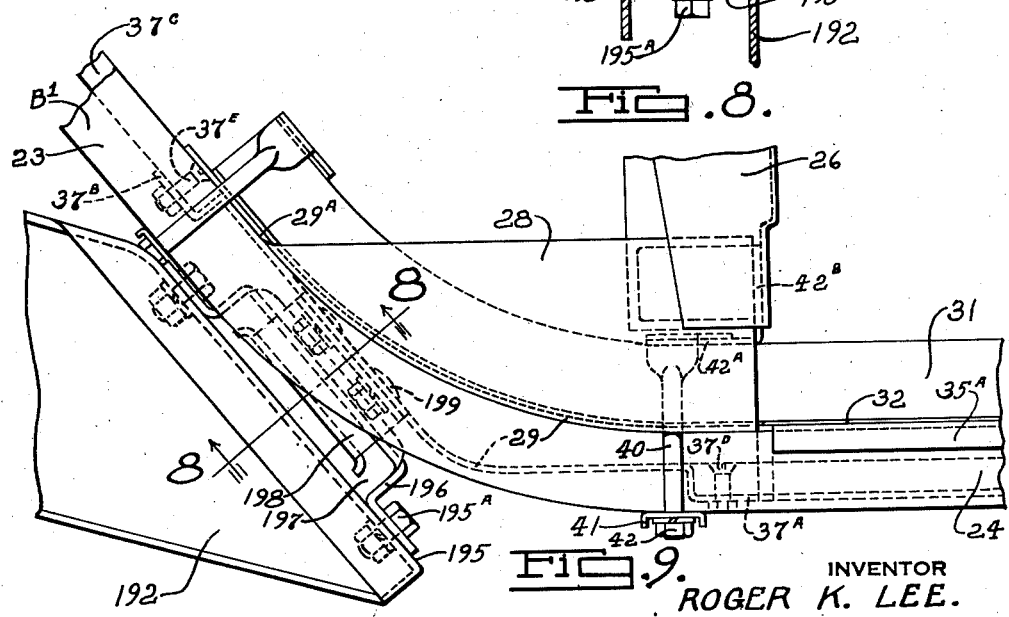
Fig. 9 is an enlarged side elevational view of the front end portion of the frame structure adjacent the lower end of the front door forward column.

I preferably provide a system of further bracing the main frame members A and B, at the same time utilizing such braces as door posts, window frames, windshield and roof frame members, and the like. Thus, for a two-door type of enclosed body structure as illustrated, the bracing may comprise the front side uprights 26 each welded or otherwise structurally connected at 27 where a pair of the extensions 12 and 14 merge, each upright 26 thereby forming the lower portion of the front door column and the rear of the cowl 13. The uprights 26 are preferably fabricated in the shape of a forwardly opening channel, as shown in Figs. 1, 9 and 10, and welded to the lower end of each upright is the upturned flange 28 of a transverse sheet metal stiffener brace plate 29 which thereby connects the uprights. The plate 29 has side portions 29ᵃ engaging the upper faces of the body rails 24 at the uprights 26 and extending forwardly therefrom to engage the upper faces of the frame portions 23 where the latter curves forwardly beyond the uprights 26 as shown in Fig. 10.

I preferably provide a double hollow beam reinforcement construction for the frame member B between uprights 26 and the lower ends of the rear door columns or pillars 30, this reinforcement comprising a tubular member 31 preferably having a cross section similar to frame member B, one of these reinforcing members 31 extending at each side of the vehicle in association with a body rail 24. The forward end of each member 31 projects forwardly beyond an upright 26, the portions 29ᵃ of the plate 29 being clamped between parallel adjacent faces of a rail 24 and member 31. The portions 29ᵃ of plate 29 which engage the rails 24 are welded thereto and interposed between adjacent faces of a rail 24 and a portion 29ᵃ is a strip of yielding sound deadening material 32, preferably rubber, this strip extending rearwardly of plate 29 to engage the upper face of the portion 33 of a floor board support bracket 34, as shown in Fig. 11. This typical section through a rail 24 and associated member 31, between an upright 26 and a pillar 30, also illustrates the rubber insulating strip 35 which is interposed between the bracket portion 33 and rail 24. Each bracket 34 has an inwardly extending flange 36 supporting the transversely extending floor board structure 37, and an outer downwardly extending flange 35ᵃ adjacent a sill 24.

The floor board 37 is preferably suitably formed, preferably as a laminated unitary structure, supported at its sides by the flanges 36 and at its forward transverse edge by the stepped transverse flange 37ᵃ formed along the forward edge of plate 29. The forward edge of this plate is also stepped at 37ᵇ to support the toe board structure 37ᶜ, fasteners 37ᵈ and 37ᵉ respectively, holding the floor 37 and toe boards 37ᶜ in place. The portion of plate 29 between steps 37ᵃ and 37ᵇ provides the floor of the body between the floor 37 and toe board 37ᶜ.

Rearwardly of each pillar 30, each reinforcing member 31 leaves the associated frame member B by reason of an upwardly and rearwardly inclined portion 38 which extends for clamping connection to a rear upright portion 19 of frame member A. From this point of connection, I preferably also extend a further tubular brace member 39 projecting horizontally forwardly for clamping connection with a pillar 30 at a point intermediate the height thereof.

The connections between the frame members A and B and the associated braces are preferably formed by a novel clamping assembly so arranged that the joints are rigidly formed and insulated against noise and transmission of undue shocks throughout the body frame structure.

Referring to Fig. 10, I have illustrated a clamping structure providing the rigid assembly of an upright 26 with a body sill 24 and associated reinforcing member 31, this assembly comprising a U-bolt 40 inverted to seat on the member 31. The legs of the U-bolt extend downwardly along the sides of sill 24, passing through bracket portion 29ᵃ and through a clamping plate 41 engaging the underface of sill 31. Nuts 42 engage the legs of the U-bolt for rigidly clamping the assembly together as illustrated. A similar clamping assembly is located adjacent the forward end of member 31, as generally indicated in Fig. 1.

Interposed between the upper part of bolt 40 is a plate 42ᵃ which has a rear upstanding flange 42ᵇ engaging the web of channel upright 26 and wolded thereto to further stiffen the upright joint with the frame members 24 and 31. If desired, the plate 42ᵃ may also be welded to the upper face of frame member 31 at each side of the body.

I have provided a novel claming means for joining the braces with portions of the main frame members, providing joints having the desired rigidity and at the same time insuring against metal-to-metal contact of the braces and frame members. Referring, for example, to the connection at section 12—12, as shown in Figs. 12 to 14, between a pillar 30 and a sill 24 and associated reinforcing member 31, it will be noted that bracket 34 is interrupted at pillar 30 above the floor boards 37 and that in addition to the rubber strip 32 between sill 24 and member 31, there is preferably interposed a further rubber strip 43. The strips 43 and 32 are separated by a metal plate 44 which assists in holding the rubber strips in proper position.

Fitting within the lower hollow end of pillar 30 is a metal cup 45 receiving a wood filler block 46, the cup having lateral side flanges 47 and 48 which are return bent and which, before final clamping assembly, are disposed as shown in Fig. 14 bent away from the sides of pillar 30. The flanges 47 and 48 receive the respective return bends 49 and 50 of a U-shaped bracket 51 which encircles sill 24 and member 31, a U-shaped strip of rubber insulating material 52 being interposed to prevent the bracket from directly engaging the frame parts. A second strip of rubber material 53 is positioned between blocks 46 and the upper face of member 31, the edges of this strip underlying the return bent portions of flanges 47 and 48. The parts are initially assembled as in Fig. 14, with a relatively tight fit, whereupon the cover clamping members 54, 55, each having an offset shoulder 56, are forced toward each other by the application of appropriate force to displace flanges 47, 48 and 49, 50 towards the axis of pillar 30 until they are brought into the Fig. 12 position. These flanges are then disposed in the direction of pillar 30 in closely nested contact, with shoulders 56 conforming to the flanges 49 and 50. The clamping members 54 and 55 are then secured as by welding at 57 to the sides of pillar 30 to hold the assembly.

When the clamping members 54 and 55 are forced toward each other as aforesaid, the bracket 51 is placed under tension and the various rubber strips are compressed, such relationship being maintained after welding the brackets 54 and 55 in their final positions. The resulting joint provides a simple connection for the frame parts and structurally reinforces these parts at their points of connection.

The joint formed at section 15—15, Fig. 15, illustrates the same general principle of my invention applied to the upper end of pillar 30 for connection to a roof rail 18. For this connection, the bracket 51$^a$ and strip 52$^a$ need only encircle one frame member 18 so that they are of shorter length than the corresponding bracket 51 and strip 52 of Fig. 12. However, the structure and assembly is otherwise as illustrated in Fig. 12 and the same reference characters are accordingly employed.

In Figs. 16 and 17 I have illustrated the joint between brace member 39 and pillar 30. In this instance the clamping bracket 51$^b$ passes around pillar 30, the yielding rubber strip 52$^b$ being interposed, the ends 56$^b$ of the bracket extending in contact with the respective sides of member 39 and secured thereto by the rivet bolts 58, each having a surrounding cylinder 59 disposed across the inner walls of member 39 to stiffen this member against the crushing tendency of the rivet joint. The rear ends of the strip 52$^b$ are engaged by a metal plate 46$^b$ which seats the end of member 39 and holds the strip in position. The plate 46$^b$ has its ends flanged at 60 to engage member 39 and prevent accidental displacement of the plate.

Figure 18:
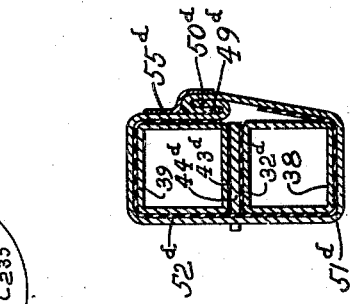
Fig. 18 is a sectional view of the frame joint taken along line 18—18 of Fig. 1.

The rear ends of brace member 39 and portion 38 of member 31 are brought into parallelism closely adjacent each other and in abutting relationship with the sloping upright portion 19 of frame member A. Members 38 and 39 are each connected to frame portion 19 by clamping assemblies 55$^c$ which are preferably formed according to the joint shown in Fig. 18 where the same general type of connection at right angles occurs. As best shown in Fig. 18 the rear ends of members 38 and 39 are further clamped together just forwardly of their clamping connection to member 19.

The ends of members 38 and 39 are maintained in spaced relationship by a plate 44$^d$ bounded by the rubber strips 43$^d$ and 32$^d$ which respectively engage members 39 and 38. The yielding strip 52$^d$ substantially encircles these frame members, the tension clamping member 51$^d$ having its ends brought together in nested return bends 49$^d$ and 50$^d$ by the clamping member 55$^d$. This clamping member is applied to produce tension in member 51$^d$ similarly to the assembly of members 54 and 55 of Fig. 12, the member 55$^d$ then being welded in position to the frame member 39. With this arrangement, the clamping ends of member 51$^d$ are not in engagement with the side faces of frame members 38 and 39 as I have found such arrangement to be about equally advantageous.

Connecting the side extensions 12 adjacent the joints 27 is a transverse brace 60 which provides a support for the surface panel forming the top of the cowl 13. Brace 60 also laterally stiffens the body structure across the front columns 14, 26 an provides the lower frame support for windshield 17. A sheet metal dash 12$^a$ extends transversely of the side extensions 12 and is welded thereto to transversely stiffen the front end of the body and to form the front end of the driver's compartment 16.

At the rear of the frame structure I have provided a rearwardly arched transverse brace 61 which has its ends connected with the respective sloping rear uprights 19 adjacent the connection of the braces 38 and 39. This brace member stiffens the rear of the frame structure transversely and performs other functions presently apparent. The connection between brace 61 and each upright 19 is preferably the same as that illustrated in Fig. 15 and need not therefore be additionally repeated in detail.

The roof panel 62 is preferably an integral metal stamping supported marginally by the rear brace 61, the side roof rails 18, a forward transverse header brace 63, and a plurality of transverse steel bows 64 extending between rails 18. The braces 60 and 63 are connected at their ends to the frame members A' and A$^2$ by a clamping connection similar to that illustrated in Fig. 15 or by welding.

The interior of the vehicle accommodates the usual front and rear seats 65 and 66, the vehicle being suitably controlled by appropriate manual controls arranged conveniently adjacent the driver's seat 65. Thus, the steering wheel is shown at 67, gearshift lever at 68, and one or more pedals 69 for clutch and brake control. Such controls do not form a part of the subject application.

Figure 19:
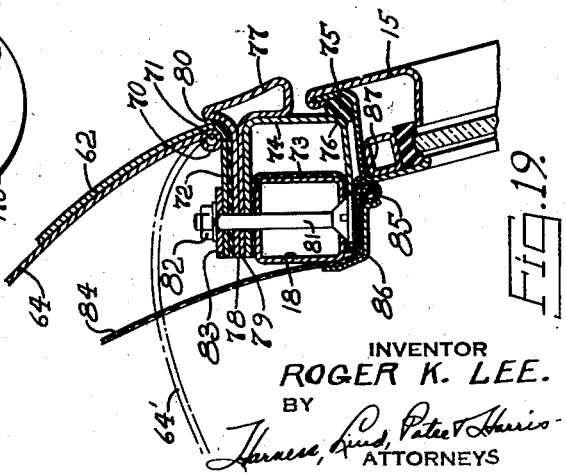
Fig. 19 is a sectional elevational view illustrating the roof structure and manner of assembly, the view being taken as indicated by line 19—19 of Fig. 5.

Referring to Fig. 19, I have illustrated the details of a typical roof bow 64 and the manner in which it is applied. Each roof bow is in the form of a flat strip of steel having its ends rolled into cylindrical shape at 70 to fit into the curved pocket 71 formed by the inwardly extending border flange 72 of the roof panel 62. After assembly of the roof panel with the body frame structure, the bows 64 are installed, the bows being inserted upwardly from within the body. The bows are of such length that on installation they are readily flexed downwardly as indicated by the dotted position at 64'. The bows being under compression, are pressed midway of their length upwardly and as the mid-section is passed upwardly beyond the plane through the opposite ends 70, the bow will spring upwardly under their own compressive force to tightly fit the undersurface of panel 62, the ends 70 thrusting outwardly against pockets 71. In this manner, the bows brace the panel 62 and maintain their position as illustrated.

Fig. 19 also illustrates the section through a roof rail 18 and door 15 adjacent a pillar 30. Seated on the upper and lower faces of rail 18, through the intermediary of the rubber strip 73, is the rail panel 74 of channel form, the door 15 having the rubber strip 75 engaging the lower corner 76 of panel 74 to insure a tight fit when the door is closed. A molding strip 77 extends ring-like around the pocket 71 of the roof panel 62 and has the inwardly extending contacting flanges 78, 79. The flange 79 seats on the rubber strip 73 while flange 72 is seated on flange 78, preferably through the medium of the rubber strip 80. The assembly is tightly held together by a series of screw bolts 81 and associated nuts 82 acting on the seat plates 83. The interior trim comprises the material 84, preferably fabric, formed around the bottom of panel 74 to carry the yielding rubber bumper strip 85 held in place by the border strip 86 suitably fastened to panel 74. The strip 85 engages the corner 87 of the door when closed to further seal the door opening.

In Fig. 20, the parts are as shown in Fig. 19 but it will be noted that the door 15 and panel 74 are narrower at this section, the panel 74 engaging the strip 73 and affording a more rigid abutment for engagement of the door strip 75.

In Fig. 21, the pillar 30 is covered by the finishing trim 88 return bent and padded at 89 for fastening by the molding strip 90 and fasteners 91 to the rear face of the pillar. The other end of the trim 88 carries the yielding bumper 85 and is held in place to the forward side of pillar 30 by fasteners 92, a retaining metal strip 93 engaging the outer portions of trim 88 while the inner portions engage the flange 94 of the pillar panel 95, a strip of rubber 96 being interposed between flange 94 and pillar 30. The panel 95 is stepped at 97, 98 respectively to seat against door bumper 75 and to carry the rear side window frame 99 for the window 100.

The window frame 99 is also supported around brace 39, roof rail 18 and frame portions 19. In Fig. 22, I have illustrated a typical support structure in which the rail panel portions 101 and 102 instead of following the shape of rail 18, as in Figs. 19 and 20, slope downwardly and outwardly from rail 18 to enclose the frame 99 and form a finishing panel therefor. An angle piece 103 is welded to panel portion 102 and maintains frame 99 against the border flanges 104, 105 of the panel portions. The inner end of panel portion 102 seats against the trim 84 beneath rail 18 and is secured thereto by the molding 106 and fasteners 107.

At the rear of the roof structure between the rails 18 and brace 61, the roof panel 62 has its flange 83 secured by fasteners 108 to the flange 109 of the rear side panel portion 110. Interposed between flanges 83 and 109 are the flanges 78, 79 and the rubber strip 80, as shown in Fig. 26ᵃ.

The moulding strip 77 and roof panel flange 83 then extend for support around the rear arched brace 61 for connection thereto, as shown in Fig. 23. In this view, the back panel 111 is reversely bent at 112 to engage strip 77 and to stiffen the panel, the flange 113 being secured by fasteners 81 to brace 61 by the reinforcing plate 114. The rubber strip 115 is interposed between brace 61 and flange 113 and is also engaged by the upper angle plate 116 engaged by strip 77 and flange 79 thereof. The assembly is otherwise as shown in Fig. 20.

At the forward end, the header 63 is assembled with the roof panel 62 and windshield frame 117 as illustrated in Fig. 24. This assembly is generally similar to Figs. 19 and 20 but differs therefrom in that the header panel 118 has a forward flange 119 fitting into the rubber lined channel portion 120 of frame 117 which is secured by fasteners 121 to header 63. The trim 84 has its return bent edge 122 secured to the header by fasteners 123 and the molding cover strip 124.

Figure 25:
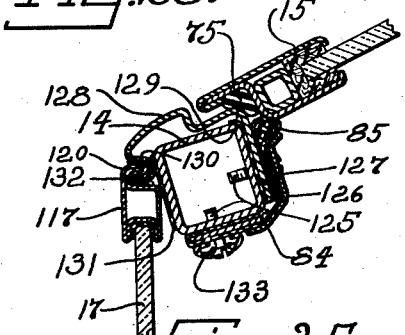
Fig. 25 is a sectional plan view through the windshield post taken along line 25—25 of Fig. 6.

The windshield post section is shown in Fig. 25, in which bumper 85 is secured by fasteners 125 and cover strip 126 to post 14, the intermediate flange 127 of the post panel 128 being stepped at 129 to engage bumper 75 of door 15 and then extending around the front corner of the post to the return bend 130 which engages rubber strip 131 and interlocks between the S-shaped rubber strip 132 in the windshield channel 120. The inner side face of post 14 is covered by the trim 84 and secured thereto by additional fasteners 125 and molding strip 133.

Figure 3:
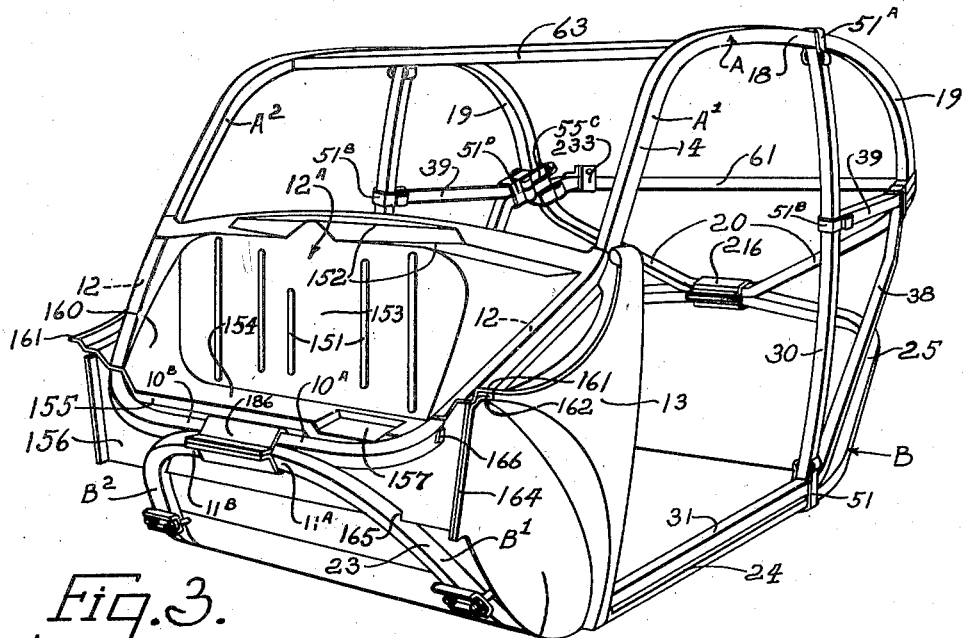
Fig. 3 is a front perspective view of my body frame illustrating the dash structure.

Figs. 3 and 26 illustrate the dash structure and lower windshield frame support. The brace 60 is preferably disposed to position its front face inclined upwardly and rearwardly substantially in the plane of the sloping windshield 17, it being understood that the windshield glass may be of the V-type defined by the sloping central brace 134 extending between header 63 and brace 60. The upper faces of brace 60 receive the rubber strip 135 on which is seated the angle bracket 136 and the frame 117, fasteners 137 and 138, respectively, securing these members to the brace.

Secured to bracket 136 by fastener 139 is the rearwardly extending instrument carrying panel 140 which extends downwardly to face the driver. The lower edge of the windshield 17 seats in the frame 117, the latter having a lower return bend 141 which interlocks through the S-shaped rubber strip 142 with the upper marginal return bend 143 of the dash panel 12ᵃ.

The front face of frame 117 carries the upstanding panel 144 which has an upper face 145 forming the top of the cowl panel. The rear edge of panel portion 145 is deflected downwardly at 146 to urge a sealing member 147 against windshield 17. The front face of panel 144 mounts a hood seal 148 by fasteners 149, this seal being engaged by the rear end of the hood structure 150. The hood is preferably of the type which is hinged at the rear to the dash by any known type of hinge to guide the rear edge of the hood forwardly and then upwardly and rearwardly when lifted at the front end.

The dash panel 12 comprises a stamping which is suitably ribbed at 151 and bent at 152 to stiffen the structure and has a generally upright part 153 extending downwardly from bends 152 and 143 to form the forward stiffening shelf 154, the latter having the forward downwardly extending skirt 155 to which is welded the extension 156. Shelf 154 is formed with a depression 157 for receiving a storage battery 158 suitably held to the shelf by releasable straps 159.

Each side of the dash flares forwardly at 160 from part 153 and upwardly from shelf 154 to seat for welding on the upper face of a frame extension 12, the flare 160 thence extending laterally outwardly to the step 161 which is welded to a corresponding step 162 of the cowl panel 13. The steps 161, 162 define the meeting edge of and support for the rear of the hood 150, the panel 13 having the wheel house portion 163 welded forwardly at 164 to the skirt extension 156. The latter, at each side, is cut away at 165 and 166 for welding connection around three sides of the sloping frame extensions 23 and 12, respectively.

Returning now to the front end connection between main frame members A and B, this connection is so arranged as to reinforce and stiffen the ends $10^a$, $10^b$ and $11^a$, $11^b$ of the respective members A', $A^2$ and B', $B^2$. Thus, each open end of frame portions $10^a$ and $10^b$ receives half the length of a steel filler block 167, a similar block 168 being inserted in frame ends $11^a$ and $11^b$. At each side of the plane containing the abutting faces of the frame ends at $10^c$ and $11^c$ the blocks 167 and 168 have registering openings 169 fitted with a dowel pin 170 which thereby aligns the frame parts A', $A^2$ and B', $B^2$ in proper relationship at the front end. Blocks 167 and 168 are likewise properly aligned and tied together to provide a composite load receiving front end frame portion which has a high degree of stiffness and torsional rigidity.

The front steerable ground wheels 171 are preferably of the independently sprung type. The illustrated arrangement comprises a wishbone lower link 172 for each wheel, these links being articulated at their inner ends 173 to the transmission and differential housing 174 for a front wheel driving arrangement. The upper guide linkage for the front wheels comprises a transverse leaf spring assembly 175 seated midway across the vehicle in a seat 176 formed in the upper face of casing 174. This seat, as best shown in Fig. 7, comprises the retaining strap 177 secured in place by fasteners 178. These fasteners also secure brackets 179 and 180 which carry the support plate 181 to which is vulcanized the rubber pad 182. Additional fasteners 183 and 184 secure the brackets and plates rigidly together.

The pad 182 carries an upper seat plate 185 also vulcanized to pad 182, this plate cooperating with an upper plate 186 to encircle the frame portions $10^a$, $10^b$ and $11^a$, $11^b$. These plates 185 and 186 are clamped together by fasteners 187, thereby rigidly connecting the main frame portions for yielding support on the wheels 171 through spring 175 and the power plant. The latter, in effect, is suspended from the front end of the frame structure and the middle portion of spring 175.

The power plant, according to the present embodiment of my invention, comprises a unitary assembly of the forwardly disposed radial cylinder engine 188 and the power transmitting gearing and mechanism in casing 174. The drive is taken through shafts 189 to the respective front wheels 171 through suitable universal joints, one of which is shown at 190, the arrangement accommodating steering of the wheels 171 from wheel 67 through tie rods 191.

The tendency for the rear end of the power plant to thrust upwardly at its rear end, by reason of the heavier front end engine portion projecting forwardly of spring 175, is yieldingly resisted by the pair of side thrust arms 192. Each of these arms is secured by fasteners 193 to a side of the casing 174 and also by a bracket 194 intermediate the end of the arm. The rear angled end 195 of each arm 192 carries by fasteners $195^a$ a channeled strap 196 spaced from end 195 to receive the rubber pad 197 in which is nested the channeled strap 198 secured at 199 to the under face of the brace plate 29. The pad 197 is preferably vulcanized to straps 196 and 198 and yieldingly supports the rear end thrusts of the power plant against the plate 29 and reinforced portions of the frame members B', $B^2$ forwardly of the lower ends of columns 26. The pad 197 provides a connection and support which is free from metal-to-metal contact.

At the rear end of the frame structure, the rear ground wheels 200 are respectively rotatably mounted on the non-rotatable tubular axle members 201, 202 for limited relative movement axially of each other. A central filler core 203 receives the inner end of each axle member and a flexible cover 204 yieldingly bridging the inner end portions of the axle members 201, 202.

At the outer end of each wheel 200 is a pivot shackle 205 mounting one end of the transverse leaf spring assembly 206. Centrally of the spring assembly, I have provided the bracket 207 and cap 208 therefor clamped at 209 to rigidly mount bracket 207 on the spring assembly. A bolt assembly 210 passes through the spring leaves to maintain their desired alignment in bracket 207.

Bracket 207 extends upwardly to provide the channeled seat 211 in which is secured at 212 the channeled member 213 to which is vulcanized the rubber pad 214 having an upper companion vulcanized clamping member 215 receiving the inner end portions of the frame ends $21^a$, $21^b$ and $22^a$, $22^b$. These frame ends are tightly held in member 215 by a companion clamping member 216 and the fasteners 217.

The rear frame ends are preferably connected and reinforced correspondingly with the front frame ends. Thus, filler blocks 218 and 219 are disposed within the adjacent portions of the frame ends $21^a$, $21^b$ and $22^a$, $22^b$, respectively. Locating dowels 220 likewise enter holes 221 in blocks 218 and 219 to align and hold the parts properly assembled. Auxiliary dowels 222 extend from pad 214 through the respective frame ends $22^a$ and $22^b$ for entry in holes 221 to maintain alignment of the bracket 207 with the frame members A and B at the rear end.

The rear of the vehicle is stabilized particularly against side sway by the telescoping stabilizers 223, each comprising an upper outer tubular guide member 224 rigidly connected between frame members A and B and which slidably receives a plunger member 225 which is connected at its lower end to one of the axle members 201 and 202 at a shackle 205.

Referring to Figs. 1 and 4, it will be noted that the lower end of the guide 224 carries a bracket 226 which engages frame member B' and is welded thereto to insure against relative displacement. At its upper end the guide 224 carries a second bracket 227, shown in Fig. 34, this bracket having flanges 228, 229, respectively, secured by fasteners 230, 231 to brackets 232 and 233. These brackets are respectively rigidly connected to frame member A' as angled flanges of the clamping members 55ᶜ and to the arched rear cross brace 61.

The plunger or inner telescoping member 225 has its lower end connected at 234 to a forward cantilever extension of the axle and shackle connecting bolt 235 so that when the axle rises and falls relative to the frame, the plunger 225 slides within guide 224, the stabilizer 223 resisting side sway of the body relative to the axle.

I have provided a novel reinforcement for the floor 37 whereby this floor may be made relatively light and yet will be sufficiently strong to withstand the loads of the seats and occupants of the vehicle. Referring to Figs. 35 to 39, the floor 37 has an X-brace reinforcement carried by its under face. This X-brace comprises the forwardly extending oblique arms 236 and the rearwardly extending oblique arms 237, pairs of forwardly and rearwardly extending arms being obliquely aligned as shown. Each arm is in the form of a sheet metal strip return bent from the oppositely extending flanges 238 to provide contacting web portions 239 and a bottom hollow or tubular stiffening margin 240. Flanges 238 are secured by fasteners 241 to the under face of the floor.

In order to stiffen the central zone of the X-brace and to rigidly connect the arms 236 and 237, each of these arms has its tubular margin 240 of increasing depth at 242 at the central zone to accommodate a plurality of layers of X-brace rods. Thus, at the bottom of the margins 242, as shown in Fig. 37, a solid rod 243 extends obliquely across the joint center at 244 to connect a pair of aligned arms 236 and 237. The other pair of arms carries rod members 245 and 246 which engage rod 243.

Above rods 243, 245 and 246 are further rods as shown in Fig. 38. In this plane the through rod 247 overlies rods 245 and 246. Rod members 248 and 249 likewise overlie the lower through rod 243 and have their inner ends abutting rod 247. The arms 236 and 237 have their ends wedged along lines 250 and 251 to closely fit together. The center joint is welded into a rigid structure along the contacting portions of the parts. Rods 245, 246 are welded at 252 to rod 243 and rods 248 and 249 are likewise welded at 253 to rod 248. Arms 236 and 237 are welded along their contacts at 250 and 251.

If preferred, the rods 243, 245 and 246, as well as rods 247, 248 and 249, may be forged or otherwise formed as solid X-members. The webs 239 of the arms 236 and 237 are preferably of gradually increasing depth toward the center of the X-brace structure to efficiently reinforce the floor according to the bending stresses arising therein.

Referring to Figs. 4 and 40, the gasoline storage tank 254 is formed substantially pear-shaped in its transverse cross-section to nest in the space between the upwardly and rearwardly sloping rear seat back 255 and the connected end portions 21ᵃ, 21ᵇ and 22ᵃ, 22ᵇ of the main frame members A', A² and B', B², respectively. Tank 254 is also located between the portions 25 of the frame members B' and B².

The tank 254 is supported by a bottom angle bracket 256 which has the upwardly and laterally extending arms 257 at its ends for supporting connection at 258 to the respective frame portions 25. Intermediate the length of bracket 256, transversely of the vehicle, this bracket has a pair of supporting bands 259 shaped to fit around approximately the lower rear quarter of the tank. Each of these bands 259 has riveted to its upstanding rear end an angle bracket 260 and a flexible steel strap 261 formed with a terminal loop 262 carrying a pin 263.

The brackets 260 are rigidly secured by the clamping assemblies 264 to frame portions 25 at points spaced inwardly from the connections at 258. Each band 259 has its other end, at the bottom of tank 254, connected to a second flexible strap 265 also terminating in loop 266 carrying a pin 267. The flexible straps 265 and 261, at each band 259, are wrapped around the tank, the ends being drawn tightly together by a turnbuckle 268 having oppositely threaded ends engaging the pins 263 and 267, respectively. In this manner the flexible straps are made to tightly fit the contour of the tank and the latter is held down securely in the bracket 256.

The rear seat back 255 is hinged at 269 at its bottom edge so that it may be conveniently tilted forwardly for access to the spare tire and wheel assembly 270 supported on a shelf 271 overlying the tank 254. The tire assembly thus fits between the sloping frame portions 20 and it is not necessary to provide an opening in the back panel 111 to remove or insert the wheel assembly 270. Furthermore, this wheel assembly is stored within the body of the vehicle and is thus safer from theft than where such assemblies are stored exteriorly of the body or accessible through trunk doors or the like from without the vehicle body.

The forward end of floor 271 is supported by the transverse panel 272 supported across the frame portions 25 and the rear end of the floor is supported by brackets 273 carried by the hollow downwardly and rearwardly sloping laterally spaced strut members 274.

The strut members 274 form part of an auxiliary rear end frame structure which is attached to the aforesaid main body frame structure primarily for taking the stresses from the rear bumper bar 275 for distribution to the main frame; also for bracing the rear outer body panel 111.

This auxiliary frame structure further comprises a pair of hollow strut structures 276 which project rearwardly from the frame portions 25 where they are suitably fastened at 277. The forward end of each strut 276 slopes forwardly and downwardly following a frame portion 25. Rearwardly of these frame portions each strut 276 arches above the rear spring 206 and then slopes downwardly to a transversely inwardly extending bent end portion 278 which overlies a channeled reinforcing member 279 and is welded thereto. This member 279 has feet 280, 281 welded to the inner face of the lower end of rear panel 111 to form a hollow transverse marginal stiffener therefor for structurally connecting the bent strut end portions 278. The feet 280, 281 are preferably welded in place with the bottom edge of panel 111 return bent at 282 to overlie foot 281.

The bumper bar 275 is supported by a pair of braces 283, each of which extends forwardly through an opening 284 for attachment at 285 to a strut 276. The lower end of each strut 274 is rigidly connected to a bent portion 278, preferably by welding, the upper end being attached by a fastening assembly 286 (similar to the joint shown in Fig. 15) to the rear end of the U-shaped brace 61.

It will thus be noted that the auxiliary frame structure comprising struts 274 and 276 provides a rigid bracing for the rearwardly overhanging panel 111 and takes the thrusts from the rear bumper to the main body frame structure.

Instead of supporting the spare tire and wheel assembly on shelf 271 above the tank 254 as in Fig. 40, I have provided a modified arrangement in Fig. 41 for supporting the spare tire below the tank. Thus, in Fig. 40, the tire assembly 270 is disposed in a compartment structure 287 opening forwardly below the rear seat 288 and supported forwardly by a transverse bracket 289. The rear end of this compartment is fastened at 290 to the aforesaid angle bracket 256 for the tank 254. Such arrangement conveniently stores the spare tire and permits a shorter length of body overhand rearwardly beyond the spring 206 than is required for the Fig. 40 structure.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. An automobile having front and rear road wheels and a frame supported on said wheels at each end thereof, said frame comprising upper and lower structurally continuous tubular members having parallel horizontal central portions disposed adjacent each other at the respective ends of the frame and means for securing said portions directly together at the ends of the frame.

2. An automobile having front and rear road wheels and a frame supported on said wheels at each end thereof, said frame comprising tubular members arranged in the form of two structurally continuous substantially oblong loops having parallel horizontal central portions disposed adjacent each other at the respective ends of said loops and means for securing said portions directly together at opposite ends of the frame.

3. An automobile having front and rear road wheels and a frame supported on said wheels at each end thereof, said frame comprising an upper and a lower frame structure, each structure comprising an endless tubular member extending along each side of the frame, means structurally connecting the tubular members of each of said frame structures at each end of the frame, said frame structures being secured together adjacent their end portions.

4. An automobile having front and rear road wheels and a frame supported on said wheels at each end thereof, said frame comprising an upper and a lower structurally continuous tubular member each arranged in the form of a substantially oblong loop and having their central portions in spaced substantially parallel relationship and their end portions bent towards each other and clamped together.

5. An automobile having front and rear road wheels and a body supported on said wheels at each end thereof, said body comprising tubular bottom members each having substantially parallel horizontal central portions and end portions bent upwardly with respect to said central portions and inwardly to form a structurally continuous loop, tubular top members each having substantially parallel horizontal central portions and end portions bent downwardly with respect to said central portions and inwardly to form a structurally continuous loop, said loops being secured together at their ends.

6. An automobile body comprising a top member arranged in the form of a truss, a bottom member arranged in the form of an inverted truss, means for securing said members directly together at the ends of the trusses, front and rear road wheels supporting said body and adapted to exert their thrust on both trusses at the points where said members are secured together.

7. An automobile comprising a body having an upper frame member arranged in a substantially oblong loop shaped in the form of a truss, a lower frame member arranged in a substantially oblong loop shaped in the form of an inverted truss, means securing the frame members together at the ends of the trusses, a reinforcing girder at each side of the body secured at its rear end to the downwardly extending rear end portion of the upper frame member and extending forwardly along and secured to the central portion of the lower frame member, a substantially U-shaped reinforcing member having its ends secured to said downwardly extending rear end portions of the upper frame member, said U-shaped member projecting rearwardly from said upper frame member, a pair of transversely spaced strut members sloping downwardly from the rear of said reinforcing member, and a pair of transversely spaced strut structures projecting rearwardly from said lower frame member for connection with the lower ends of said strut members.

8. An automobile comprising a body having an upper frame member arranged in a substantially oblong loop shaped in the form of a truss, a lower frame member arranged in a substantially oblong loop shaped in the form of an inverted truss, means securing the frame members together at the ends of the trusses, a reinforcing girder at each side of the body secured at its rear end to the downwardly extending rear end portion of the upper frame member and extending forwardly along and secured to the central portion of the lower frame member, a substantially U-shaped reinforcing member having its ends secured to said downwardly extending rear end portions of the upper frame member, said U-shaped member projecting rearwardly from said upper frame member, a pair of transversely spaced strut members sloping downwardly from the rear of said reinforcing member, a pair of transversely spaced strut structures projecting rearwardly from said lower frame member for connection with the lower ends of said strut members, said body having a rear outer panel sloping downwardly and rearwardly adjacent said strut members and having its lower edge curved forwardly around the rear ends of said strut structures, a rear bumper structure, and bumper supports extending rearwardly from said bumper through said rear panel for attachment to said strut structures.

9. An automobile comprising a body having an upper frame member comprising a structurally continuous substantially oblong loop the central portions of which constitute the support of the roof, the front ends of which extend downwardly to constitute side supports for the windshield and then curve towards and are secured to each other and the rear ends of which extend downwardly and rearwardly and have their ends secured together, and a lower frame member comprising a structurally continuous substantially oblong loop the central portions of which support the floor of the car, the front portions of which extend forwardly and upwardly and have their ends directly secured to the front ends of the upper frame member and the rear ends of which extend rearwardly and upwardly and are secured to the rear ends of the upper frame member.

10. An automobile comprising a body having an upper frame member arranged in a substantially oblong loop shaped in the form of a truss, a lower frame member arranged in a substantially oblong loop shaped in the form of an inverted truss, means securing the frame members together at the ends of the trusses, a reinforcing girder at each side of the body secured at its rear end to the downwardly extending rear end portion of the upper frame member and extending forwardly along and secured to the central portion of the lower frame member.

11. An automobile comprising a body having an upper frame member arranged in a substantially oblong loop bent into the form of a truss, a lower frame member arranged in a substantially oblong loop bent into the form of an inverted truss, means securing the frame members together at the ends of the trusses, a reinforcing girder at each side of the body secured at its rear end to the downwardly extending rear end portion of the upper frame member and extending forwardly along and adjacent to a portion of the lower frame member, and means securing said girder to said frame member at points fore and aft of the car door opening.

12. An automobile comprising a body having an upper frame member arranged in a substantially oblong loop bent into the form of a truss, a lower frame member arranged in a substantially oblong loop bent into the form of an inverted truss, means securing the frame members together at the ends of the trusses, a reinforcing girder at each side of said body secured at its rear end to the downwardly extending rear end portion of the upper frame member and extending forwardly along a portion of the lower frame member, floor structure supporting means interposed between said girder and lower frame member, and means securing said girders, floor structure supporting means and lower frame member together at points fore and aft of the car door openings.

13. An automobile comprising a body having a top frame member arranged in the form of a truss, a bottom frame member arranged in the form of an inverted truss, means for securing said members together at the ends of the trusses, a roof structure interconnecting the two sides of the upper frame member, substantially vertical struts interconnecting the upper and lower frame members on both sides of the body and defining door openings therein, and a longitudinally extending strut extending along and secured to the lower frame member throughout the width of the door opening and extending upwardly and rearwardly from the rear of said door opening and secured to said upper frame member.

14. In a motor vehicle body structure, upper and lower longitudinally extending frame members disposed at each side of the vehicle, said frame members at each end of the body structure sloping toward each other and transversely of the vehicle, means structurally connecting said transversely extending portions of said upper frame members at each end of said body structure, and means structurally connecting said transversely extending portions of said lower frame members at each end of said body structure.

15. In a motor vehicle body structure, upper and lower longitudinally extending frame members disposed at each side of the vehicle, said frame members at each end of the body structure sloping toward each other and transversely of the vehicle, means structurally connecting said transversely extending portions of said upper frame members at each end of said body structure, means structurally connecting said transversely extending portions of said lower frame members at each end of said body structure, and means structurally connecting the connected portions of said upper members with the connected portions of said lower members at each end of said body structure.

16. In a motor vehicle body frame structure, a pair of structurally continuous frame members respectively encircling the top and bottom portions of said frame structure, said frame members being directly connected together at each end of said frame structure longitudinally centrally thereof, and means for yieldingly mounting each end of said frame structure on a pair of ground wheels, each of said mounting means including a load transmitting connector loading said frame members at said connection.

17. In a motor vehicle body frame structure, vertically spaced longitudinally extending bottom and top rails at each side of said frame structure, said rails being brought together at each end of said frame structure, a reinforcing rail for each of said bottom rails, said reinforcing rail having a portion extending along the bottom rail and having a rear end portion inclined from said bottom rail for connection to the corresponding top rail, and a door column at each side of said frame structure connecting the top rail with the bottom rail and the reinforcing rail.

18. In a motor vehicle body frame structure, vertically spaced longitudinally extending bottom and top rails at each side of said frame structure, said rails being brought together at each end of said frame structure, a reinforcing rail for each of said bottom rails, said reinforcing rail having a portion extending along the bottom rail and having a rear end portion inclined from said bottom rail for connection to the corresponding top rail, a door column at each side of said frame structure connecting the top rail with the bottom rail and the reinforcing rail, and a strut member at each side of said frame connecting an intermediate portion of said door column with the juncture of the reinforcing rail and top rail.

19. An automobile comprising a body having an upper frame member arranged in a substantially oblong loop shaped in the form of a truss, a lower frame member arranged in a substantially oblong loop shaped in the form of an inverted truss, means securing the frame members together at the ends of the trusses, a reinforcing girder at each side of the body secured at its rear end to the downwardly extending rear end portion of the upper frame member and extending forwardly along and secured to the central portion of the lower frame member, and a substantially U-shaped reinforcing member having its ends secured to said downwardly extending rear end portions of the upper frame member, said U-shaped member projecting rearwardly from said upper frame member.

20. In a vehicle body frame structure, upper and lower tubular frame members at each side of the body, said upper frame members at one end of said body being deflected toward each other transversely of the body to position their ends in alignment adjacent each other, said lower frame members at said body end being deflected toward each other transversely of the body to position their ends in alignment adjacent each other and below the ends of the upper frame members, and reinforcing filler bars respectively disposed within the aligned ends of said upper and lower members for connecting said ends.

21. In a vehicle body frame structure, upper and lower tubular frame members at each side of the body, said upper frame members at one end of said body being deflected toward each other transversely of the body to position their ends in alignment adjacent each other, said lower frame members at said body end being deflected toward each other transversely of the body to position their ends in alignment adjacent each other and below the ends of the upper frame members, reinforcing filler bars respectively disposed within the aligned ends of said upper and lower members for connecting said ends, and a dowel pin disposed to each side of the adjacent ends of said upper and lower frame members, each of said dowel pins extending through one of said frame members and at least partially through both of said filler bars.

22. In a motor vehicle body frame structure, upper and lower frame members of hollow rectangular cross-section each arranged in the form of a structurally continuous loop, the end portions of said loops extending adjacent each other transversely of the body, means for securing said end portions together, and a strip of yielding material between the adjacent portions of said loops.

23. In a motor vehicle body frame structure, upper and lower frame members of hollow rectangular cross-section each arranged in the form of a structurally continuous loop, the end portions of said loops extending adjacent each other transversely of the body to form a double hollow beam structure at each end of the body frame, the major axes of said double hollow beams inclining upwardly toward each other.

24. In a vehicle body frame structure, upper and lower tubular frame members at each side of the body, said upper frame members at one end of said body being deflected toward each other transversely of the body to position their ends in alignment adjacent each other, said lower frame members at said body end being deflected toward each other transversely of the body to position their ends in alignment adjacent each other and below the ends of the upper frame members, the adjacent end portions of said upper and lower frame members forming a double hollow beam structure having its major axis inclined upwardly and toward the other end of the body.

25. In a vehicle body frame structure, upper and lower tubular frame members at each side of the body, said upper frame members at one end of said body being deflected toward each other transversely of the body to position their ends in alignment adjacent each other, said lower frame members at said body end being deflected toward each other transversely of the body to position their ends in alignment adjacent each other and below the ends of the upper frame members, and a strip of yielding material between the adjacent faces of said upper and lower frame members.

26. In a motor vehicle body frame structure, upper and lower frame members of hollow cross-section each arranged in the form of a structurally continuous loop, the end portions of said loops extending adjacent each other transversely of the body, and clamping means at each end of said frame structure encircling said adjacent portions of said frame members for rigidly securing said frame members together.

27. An automobile comprising a body having an upper frame member arranged in a substantially oblong loop bent into the form of a truss, a lower frame member arranged in a substantially oblong loop bent into the form of an inverted truss, means securing the frame members together at the ends of the trusses, a reinforcing girder at each side of the body secured at its rear end to the downwardly extending rear end portion of the upper frame member and extending forwardly along and adjacent to a portion of the lower frame member, an upstanding door column at each side of the body connecting said upper and lower frame members, a brace plate extending transversely of the body and having its opposite end portions disposed between one of said reinforcing girders and a portion of said lower frame member, and means structurally connecting the lower end of each of said columns with an end portion of said brace plate.

28. An automobile comprising a body having an upper frame member arranged in a substantially oblong loop bent into the form of a truss, a lower frame member arranged in a substantially oblong loop bent into the form of an inverted truss, means securing the frame members together at the ends of the trusses, a reinforcing girder at each side of the body secured at its rear end to the downwardly extending rear end portion of the upper frame member and extending forwardly along and adjacent to a portion of the lower frame member, and a brace plate extending transversely of the body and having its ends disposed between one of said reinforcing girders and a portion of said lower frame member.

29. An automobile comprising a body having an upper frame member arranged in a substantially oblong loop bent into the form of a truss, a lower frame member arranged in a substantially oblong loop bent into the form of an inverted truss, means securing the frame members together at the ends of the trusses, a reinforcing girder at each side of the body secured at its rear end to the downwardly extending rear end portion of the upper frame member and extending forwardly along and adjacent to a portion of the lower frame member, an upstanding door column at each side of the body connecting said upper and lower frame members, a brace plate extending transversely of the body and having its opposite end portions disposed between one of said reinforcing girders and a portion of said lower frame member, means structurally connecting the lower end of each of said columns with an end portion of said brace plate, and means for clamping the adjacent portions of said reinforcing girders and lower frame member in proximity to each of said columns.

30. An automobile comprising a body having an upper frame member arranged in a substantially oblong loop bent into the form of a truss, a lower frame member arranged in a substantially oblong loop bent into the form of an inverted truss, means securing the frame members together at the ends of the trusses, a reinforcing girder at each side of the body secured at its rear end to the downwardly extending rear end portion of the upper frame member and extending forwardly along and adjacent to a portion of the lower frame member, an upstanding door column at each side of the body connecting said upper and lower frame members, a brace plate extending transversely of the body and having its opposite end portions disposed between one of said reinforcing girders and a portion of said lower frame member, means structurally connecting the lower end of each of said columns with an end portion of said brace plate, and means for clamping the adjacent portions of said reinforcing girders and lower frame member in proximity to each of said columns, said clamping means including a stiffener member connected to the lower end of each of said columns.

31. In a motor vehicle body frame structure, longitudinally extending bottom side rails having their forward portions curved upwardly and inwardly toward each other at the front of the frame structure, a brace plate extending transversely of the frame structure and having its end portions curved to overlie said curved portions of said side rails, a pair of reinforcing members overlying said brace plate and respectively having end portions extending rearwardly along said bottom rails, a transversely extending toe-board structure supported by the forward transversely extending end of said brace plate, and a floor structure between said side rails supported by the transversely extending end of said brace plate.

32. An automobile body comprising a structurally continuous top member arranged in the form of a truss, a structurally continuous bottom member arranged in the form of an inverted truss, means for directly securing said members together at the ends of the trusses, said trusses being of equal length and substantially equal in length to the wheelbase of the automobile, springs mounted on the ends of the trusses, and road wheels mounted on said springs.

33. An automobile comprising a body having a structurally continuous top member arranged in the form of a truss, a structurally continuous bottom frame member arranged in the form of an inverted truss, means for directly securing said members together at the ends of the trusses, an engine mounted on one end of the united trusses, spring mechanism mounted on each end of the united trusses, and road wheels mounted on said spring mechanisms.

34. A structural joint for a vehicle frame comprising a continuous frame girder, a second frame girder disposed at an angle to said continuous girder and in abutting relationship thereto and provided on each of two sides with an outwardly projecting flange, a member at least partially encircling said continuous girder and having inwardly projecting flanges adapted to interlock with the flanges on said second girder, said flanges being adapted to be bent inwardly towards said second girder to exert a tension on said encircling member.

35. A structural joint for a vehicle frame comprising a hollow continuous metal frame girder, a second hollow metal frame girder disposed at an angle to said continuous girder and in abutting relationship thereto, a fastening member adapted to fit within and be secured to the end of the second girder and having integral outwardly extending flanges extending angularly away from said continuous girder, and a metallic member extending at least partially around said continuous girder and having return bent end portions adapted to fit over the flanges of said fastening member, said interlocked flanges and return bent end portions being adapted to be bent into contiguous relationship with said second girder to place said encircling member under tension.

36. A structural joint for a vehicle frame comprising a hollow continuous metal frame girder, a second hollow metal frame girder disposed at an angle to said continuous girder and in abutting relationship thereto, a fastening member adapted to fit within and be secured to the end of the second girder and having integral outwardly extending flanges extending angularly away from said continuous girder, and a metallic member extending at least partially around said continuous girder and having return bent end portions adapted to fit over the flanges of said fastening member, said interlocked flanges and end portions being adapted to be bent into contiguous relationship with said second girder to place said encircling member under tension, and a layer of resilient material disposed between said continuous girder and said encircling member.

37. A structural joint for a vehicle frame comprising a hollow continuous metal frame girder, a second hollow metal frame girder disposed at an angle to said continuous girder and in abutting relationship thereto, a dished metallic member adapted to fit within the end of the second girder and having integral outwardly extending flanges extending angularly away from said continuous girder, a reinforcing member disposed within said dished member having an exterior surface adapted to conform to the adjacent surface of the continuous girder, a fastening member extending at least partially around said continuous girder and having return bent end portions adapted to interlock with the flanges of the dished member, said flanges and end portions being adapted to be bent into contiguous relation with the second girder to exert a tension on the fastening member, and a layer of rubber disposed intermediate said fastening member and said continuous girder and between said continuous girder and said second girder and its associated dished and reinforcing members.

38. In a motor vehicle body frame structure, a continuous metal frame girder, a second hollow metal frame girder substantially rectangular in cross-section disposed substantially at right angles to said continuous girder and having one end terminating adjacent thereto, a non-metallic filler block in the end of said hollow girder having an outer face conforming with the adjacent surface of the continuous girder, and means for clampingly securing said girders together.

39. A structural joint for a vehicle frame comprising two parallel adjacently disposed metallic frame girders and means for securing said girders together comprising a metallic band at least partially encircling both of said girders, a layer of resilient material disposed intermediate said girders and between said girders and said metallic band, and means for exerting a tension on said band.

40. A structural joint for a vehicle frame comprising two parallel adjacently disposed frame girders and means for securing said girders together comprising a metallic band at least partially encircling both of said girders, a layer of resilient material disposed intermediate said girders and between said girders and said metallic band, and means integral with said band for exerting a tension thereon.

41. A structural joint for a vehicle frame comprising two parallel adjacently disposed frame girders and means for securing said girders together comprising a metallic band at least partially encircling both of said girders, a layer of resilient material disposed intermediate said girders and between said girders and said metallic band, the ends of said band being in overlapping relationship and oppositely bent and interlocked, said interlocked ends being adapted to exert a tension on said band when they are bent into planes parallel with the adjacent sides of the girders.

42. A structural joint for a vehicle frame comprising a continuous frame girder, a second frame girder disposed at an angle to said continuous girder and in abutting relationship thereto and provided on each of two sides with an outwardly projecting flange, a member at least partially encircling said continuous girder and having inwardly projecting flanges adapted to interlock with the flanges on said second girder, said flanges being adapted to be bent inwardly towards said second girder to exert a tension on said encircling member, and a pair of clamping members respectively rigidly secured to said sides of said second girder, each of said clamping members having end portions overlying the interlocked flanges of one end of said encircling member for holding the flanges in position.

43. In a motor vehicle body frame structure, a continuous metal frame girder, a second hollow metal frame girder substantially rectangular in cross-section disposed substantially at right angles to said continuous girder and having one end terminating adjacent thereto, a hollow member internally bracing the end of said hollow girder, a clamping band having end portions engaging opposite side faces of said hollow member and an intermediate portion extending at least partially around said continuous girder for securing said girders together, and a fastener extending through said hollow bracing member and through said side faces of said hollow member for attachment with said clamping band end portions.

44. In a motor vehicle body frame structure, a continuous metal frame girder, a second hollow metal frame girder substantially rectangular in cross-section disposed substantially at right angles to said continuous girder and having one end terminating adjacent thereto, a plate seated on the end of said hollow member, yielding material around said continuous member and between said plate and said continuous member, and a clamping member connected to said hollow member and engaging said yielding material for connecting said members together.

45. In a motor vehicle body, a floor structure, and an X-brace for said floor structure, each of the arms of said X-brace comprising a return bent member forming a hollow flange extending longitudinally of said arm.

46. In a motor vehicle body, a floor structure, an X-brace for said floor structure, each of the arms of said X-brace comprising a return bent member forming a hollow flange extending longitudinally of said arm, and an X-shaped reinforcement for the central region of said X-brace, the legs of said reinforcement respectively entering the hollow flanges of the arms of said X-brace.

47. In a motor vehicle body, a floor structure, an X-brace for said floor structure, each of the arms of said X-brace comprising a return bent member forming a hollow flange extending longitudinally of said arm, said hollow flanges being increased in depth centrally of said X-brace relative to the depth thereof remotely from the central region of the X-brace, and a pair of superimposed X-shaped reinforcements for the central region of said X-brace, the legs of said reinforcements respectively entering the relatively deep portions of the hollow flanges of the arms of said X-brace.

48. In a motor vehicle body, a pair of longitudinally extending side rails, a floor structure between said side rails, said floor structure comprising a wood body portion and a reinforcement therefor, said reinforcement comprising a substantially X-shaped metal brace secured to the under face of said wood body portion, the legs of said X-brace being welded together at the central region of the X-brace.

49. In a motor vehicle body, a pair of longitudinally extending side rails, a floor structure between said side rails, said floor structure comprising a wood body portion and a reinforcement therefor, said reinforcement comprising a substantially X-shaped metal brace secured to the under face of said wood body portion, said reinforcement further comprising a supplemental X-stiffener for the central region of said X-brace, the legs of said X-brace and said X-stiffener being welded together at a common central region.

50. In a vehicle body structure, upper and lower longitudinally extending rails, a vertical hollow door pillar connecting intermediate portions of said rails, said pillar being substantially rectangular in cross section, a pillar panel having a flange disposed adjacent the forward face of said pillar and having a rearwardly extending portion spaced outwardly from the side face of said pillar for engagement with a swinging door, said rearward extension terminating rearwardly in an outwardly stepped portion, and a window frame secured between said pillar side face and said pillar panel stepped portion.

51. In a vehicle body structure, upper and lower longitudinally extending rails, a vertical hollow door pillar connecting intermediate portions of said rails, said pillar being substantially rectangular in cross section, a pillar panel having a flange disposed adjacent the forward face of said pillar and having a rearwardly extending portion spaced outwardly from the side face of said pillar for engagement with a swinging door, said rearward extension terminating rearwardly in an outwardly stepped portion, a window frame secured between said pillar side face and said pillar panel stepped portion, a strip of yielding material between said pillar and said pillar panel flange, an interior covering engaging the rear and inner faces of the pillar and having an end portion overlying said pillar panel flange, and a retaining strip overlying the end portion of said interior covering.

52. In a vehicle body structure, a pair of roof rails sloping downwardly at the rear of the body, a hollow transverse brace connecting said rails, said brace being of rectangular cross section having an axis thereof inclined upwardly and forwardly, an angle plate overlying the upper faces of said brace, a molding strip having an inwardly extending flange overlying one flange of said angle plate, a roof panel having a flanged edge overlying said molding strip flange, an outer rear panel having a return bend contiguous with said molding strip and further having a flange underlying a face of said brace, and a reinforcing plate below said rear panel flange.

53. In a vehicle body structure, a pair of roof rails sloping downwardly at the rear of the body, a hollow transverse brace connecting said rails, said brace being of rectangular cross section having an axis thereof inclined upwardly and forwardly, an angle plate overlying the upper faces of said brace, a molding strip having an inwardly extending flange overlying one flange of said angle plate, a roof panel having a flanged edge overlying said molding strip flange, an outer rear panel having a return bend contiguous with said molding strip and further having a flange underlying a face of said brace, a reinforcing plate below said rear panel flange, and yielding sound insulating material disposed between said brace and said angle plate and reinforcing plate.

54. In a vehicle body frame structure, lower side rails having their rear end portions sloping upwardly and transversely inwardly of the body in structural continuity, ground wheel supporting means attached to said transversely extending rail portions, a rear outer body panel sloping downwardly and rearwardly of the vehicle, a transverse stiffener member carried by the bottom of said rear panel on the inner side thereof, and a pair of strut structures respectively connecting said stiffener member with the rear end portions of said side rails.

55. In a vehicle body frame structure, lower side rails having their rear end portions sloping upwardly and transversely inwardly of the body in structural continuity, ground wheel supporting means attached to said transversely extending rail portions, a rear outer body panel sloping downwardly and rearwardly of the vehicle, a transverse stiffener member carried by the bottom of said rear panel on the inner side thereof, a pair of strut structures respectively connecting said stiffener member with the rear end portions of said side rails, and bumper struts respectively attached to said strut structures and projecting rearwardly therefrom through said rear panel.

ROGER K. LEE.